(12) United States Patent  
Tuttle et al.

(10) Patent No.: US 8,407,722 B2
(45) Date of Patent: Mar. 26, 2013

(54) ASYNCHRONOUS MESSAGING USING A NODE SPECIALIZATION ARCHITECTURE IN THE DYNAMIC ROUTING NETWORK

(75) Inventors: Timothy Tuttle, San Francisco, CA (US); Karl E. Rumelhart, Palo Alto, CA (US)

(73) Assignee: Shaw Parsing L.L.C., Las Vegas, NV (US)

(*) Notice: Subject to any disclaimer, the term of this patent is extended or adjusted under 35 U.S.C. 154(b) by 1127 days.

(21) Appl. No.: 11/396,251

(22) Filed: Mar. 30, 2006

(65) Prior Publication Data

US 2007/0239822 A1    Oct. 11, 2007

Related U.S. Application Data

(63) Continuation of application No. 10/105,018, filed on Mar. 21, 2002, now Pat. No. 7,051,070, which is a continuation-in-part of application No. 10/017,182, filed on Dec. 14, 2001, now Pat. No. 7,043,525.

(Continued)

(51) Int. Cl.
*G06F 3/00*  (2006.01)
*G06F 15/16*  (2006.01)
(52) U.S. Cl. ........................... 719/316; 709/206
(58) Field of Classification Search .................. 709/203, 709/219; 719/309
See application file for complete search history.

(56) References Cited

U.S. PATENT DOCUMENTS 5,230,048 A * 7/1993 Moy ............................... 707/1
5,535,335 A    7/1996 Cox et al.
5,692,193 A   11/1997 Jagannathan et al.
5,699,523 A   12/1997 Li et al.
5,706,516 A    1/1998 Chang et al.
5,732,219 A    3/1998 Blumer et al.
5,754,939 A    5/1998 Herz et al.

(Continued)

FOREIGN PATENT DOCUMENTS

EP    0 733 983 A2    9/1996
EP    0 749 081 A1   12/1996

(Continued)

OTHER PUBLICATIONS

Franklin et al., "Dissemination-Based Information Systems," IEEE Data Engineering Bulletin, vol. 19, No. 3, Sep. 1996, 9 pages.

(Continued)

*Primary Examiner* — Andy Ho
*Assistant Examiner* — Tuan Dao
(74) *Attorney, Agent, or Firm* — Sterne, Kessler, Goldstein & Fox P.L.L.C.

(57) ABSTRACT

A network routes update messages containing updates to properties of live objects from input sources to clients having the objects. When the clients receive live objects, the clients identify the object IDs associated with the objects and register the object IDs with the routing network. The routing network is adapted to selectively send update messages to nodes in the network and the nodes forward the messages to the clients. One implementation uses a hierarchy of registries to indicate which nodes and clients receive which update messages. Another implementation assigns update messages to one or more of N categories and nodes to one or more of M types, and the gateways maintain mapping between categories and types. To ensure that clients receive all of the update messages for which they register, the clients connect to client proxies that in turn connect to at least one node of each type.

37 Claims, 12 Drawing Sheets

Related U.S. Application Data

(60) Provisional application No. 60/256,613, filed on Dec. 18, 2000, provisional application No. 60/276,847, filed on Mar. 16, 2001, provisional application No. 60/278,303, filed on Mar. 21, 2001, provisional application No. 60/279,608, filed on Mar. 28, 2001, provisional application No. 60/280,627, filed on Mar. 29, 2001.

(56) References Cited

U.S. PATENT DOCUMENTS

| | | | |
|---|---|---|---|
| 5,822,543 | A | 10/1998 | Dunn et al. |
| 5,845,324 | A | 12/1998 | White et al. |
| 5,878,420 | A | 3/1999 | de la Salle |
| 5,886,643 | A | 3/1999 | Diebboll et al. |
| 5,919,247 | A | 7/1999 | Van Hoff et al. |
| 5,933,429 | A | 8/1999 | Bubenik et al. |
| 5,938,733 | A | 8/1999 | Heimsoth et al. |
| 5,964,839 | A | 10/1999 | Johnson et al. |
| 5,974,457 | A | 10/1999 | Waclawsky et al. |
| 6,018,619 | A | 1/2000 | Allard et al. |
| 6,029,175 | A | 2/2000 | Chow et al. |
| 6,052,447 | A | 4/2000 | Golden et al. |
| 6,055,493 | A | 4/2000 | Ries et al. |
| 6,091,724 | A * | 7/2000 | Chandra et al. ............ 370/390 |
| 6,094,681 | A | 7/2000 | Shaffer et al. |
| 6,112,240 | A | 8/2000 | Pogue et al. |
| 6,138,158 | A | 10/2000 | Boyle et al. |
| 6,173,406 | B1 | 1/2001 | Wang et al. |
| 6,233,600 | B1 | 5/2001 | Salas et al. |
| 6,240,451 | B1 | 5/2001 | Campbell et al. |
| 6,253,167 | B1 | 6/2001 | Matsuda et al. |
| 6,256,747 | B1 | 7/2001 | Inohara et al. |
| 6,292,835 | B1 | 9/2001 | Huang et al. |
| 6,308,209 | B1 | 10/2001 | Lecheler |
| 6,314,459 | B1 * | 11/2001 | Freeman ............... 709/220 |
| 6,324,587 | B1 * | 11/2001 | Trenbeath et al. ........... 719/310 |
| 6,363,421 | B2 | 3/2002 | Barker et al. |
| 6,366,926 | B1 * | 4/2002 | Pohlmann et al. ......... 707/104.1 |
| 6,405,245 | B1 | 6/2002 | Burson et al. |
| 6,408,282 | B1 | 6/2002 | Buist |
| 6,418,448 | B1 | 7/2002 | Sarkar |
| 6,418,467 | B1 | 7/2002 | Schweitzer et al. |
| 6,446,257 | B1 | 9/2002 | Pradhan et al. |
| 6,449,638 | B1 | 9/2002 | Wecker et al. |
| 6,460,036 | B1 | 10/2002 | Herz |
| 6,484,143 | B1 | 11/2002 | Swildens et al. |
| 6,502,131 | B1 | 12/2002 | Vaid et al. |
| 6,510,323 | B1 * | 1/2003 | Stocker et al. ............ 455/466 |
| 6,539,427 | B1 | 3/2003 | Natarajan et al. |
| 6,553,413 | B1 | 4/2003 | Leighton et al. |
| 6,560,611 | B1 | 5/2003 | Nine et al. |
| 6,567,411 | B2 | 5/2003 | Dahlen |
| 6,577,328 | B2 | 6/2003 | Matsuda et al. |
| 6,606,596 | B1 | 8/2003 | Zirngibl et al. |
| 6,606,643 | B1 | 8/2003 | Emens et al. |
| 6,609,138 | B1 | 8/2003 | Merriam |
| 6,654,804 | B1 | 11/2003 | Fleming |
| 6,658,652 | B1 | 12/2003 | Alexander et al. |
| 6,687,729 | B1 | 2/2004 | Sievert et al. |
| 6,691,165 | B1 | 2/2004 | Bruck et al. |
| 6,725,446 | B1 | 4/2004 | Hahn et al. |
| 6,728,747 | B1 | 4/2004 | Jenkins et al. |
| 6,751,663 | B1 | 6/2004 | Farrell et al. |
| 6,760,324 | B1 | 7/2004 | Scott et al. |
| 6,769,009 | B1 | 7/2004 | Reisman |
| 6,789,115 | B1 | 9/2004 | Singer et al. |
| 6,792,458 | B1 | 9/2004 | Muret et al. |
| 6,829,642 | B1 | 12/2004 | Giroir et al. |
| 6,832,222 | B1 | 12/2004 | Zimowski |
| 6,836,886 | B2 | 12/2004 | Tuerke et al. |
| 6,871,346 | B1 | 3/2005 | Kumbalimutt et al. |
| 6,918,084 | B1 | 7/2005 | Slaughter et al. |
| 6,970,924 | B1 | 11/2005 | Chu et al. |
| 7,020,082 | B2 | 3/2006 | Bhagavath et al. |
| 7,043,525 | B2 | 5/2006 | Tuttle et al. |
| 7,051,070 | B2 | 5/2006 | Tuttle et al. |
| 7,107,326 | B1 | 9/2006 | Fijolek et al. |
| 7,127,720 | B2 | 10/2006 | Cano et al. |
| 7,139,844 | B2 | 11/2006 | Smith et al. |
| 7,159,034 | B1 | 1/2007 | Rai |
| 7,207,043 | B2 | 4/2007 | Blythe et al. |
| 7,209,959 | B1 * | 4/2007 | Campbell et al. ............ 709/219 |
| 7,249,197 | B1 | 7/2007 | Roestenburg et al. |
| 7,263,547 | B2 | 8/2007 | Kloba et al. |
| 7,277,917 | B2 | 10/2007 | Tuttle et al. |
| 7,293,074 | B1 * | 11/2007 | Jellinek et al. ............... 709/218 |
| 7,350,213 | B2 | 3/2008 | Deutesfeld et al. |
| 7,412,518 | B1 | 8/2008 | Duigou et al. |
| 7,426,721 | B1 | 9/2008 | Saulpaugh et al. |
| 7,430,610 | B2 | 9/2008 | Pace et al. |
| 7,516,177 | B2 | 4/2009 | Knapp et al. |
| 7,565,359 | B2 | 7/2009 | Nazem et al. |
| 2001/0012299 | A1 | 8/2001 | Dahlen |
| 2001/0047426 | A1 | 11/2001 | Hunter |
| 2002/0010757 | A1 | 1/2002 | Granik et al. |
| 2002/0013852 | A1 | 1/2002 | Janik |
| 2002/0024536 | A1 | 2/2002 | Kahan et al. |
| 2002/0056004 | A1 | 5/2002 | Smith et al. |
| 2002/0073165 | A1 | 6/2002 | McNulty et al. |
| 2002/0078251 | A1 | 6/2002 | Lewis |
| 2002/0087630 | A1 * | 7/2002 | Wu ............................ 709/203 |
| 2002/0095399 | A1 | 7/2002 | Devine et al. |
| 2002/0120717 | A1 * | 8/2002 | Giotta ........................ 709/219 |
| 2002/0165977 | A1 * | 11/2002 | Novaes ....................... 709/238 |
| 2003/0026254 | A1 | 2/2003 | Sim |
| 2003/0041110 | A1 | 2/2003 | Wenocur et al. |
| 2003/0120817 | A1 | 6/2003 | Ott et al. |
| 2003/0140111 | A1 | 7/2003 | Pace et al. |
| 2004/0139433 | A1 | 7/2004 | Blythe et al. |
| 2004/0148606 | A1 | 7/2004 | Hosoe |
| 2004/0199926 | A1 | 10/2004 | Gilgen et al. |
| 2004/0215493 | A1 | 10/2004 | Koppes et al. |
| 2005/0027815 | A1 | 2/2005 | Christodoulou et al. |
| 2005/0033841 | A1 | 2/2005 | McCarthy et al. |
| 2005/0125557 | A1 | 6/2005 | Vasudevan et al. |
| 2005/0278726 | A1 | 12/2005 | Cano et al. |
| 2006/0031282 | A1 | 2/2006 | Tuttle et al. |
| 2006/0031283 | A1 | 2/2006 | Tuttle et al. |
| 2006/0041681 | A1 | 2/2006 | Rumelhart |
| 2006/0075279 | A1 | 4/2006 | Cameros et al. |
| 2006/0117318 | A1 | 6/2006 | Rumelhart et al. |
| 2006/0265488 | A1 | 11/2006 | Tuttle et al. |
| 2007/0033293 | A1 | 2/2007 | Rumelhart |
| 2007/0050519 | A1 | 3/2007 | Cano et al. |
| 2007/0061811 | A1 | 3/2007 | Rumelhart et al. |
| 2009/0077173 | A1 | 3/2009 | Lowery et al. |

FOREIGN PATENT DOCUMENTS

| | | |
|---|---|---|
| EP | 0 889 421 A1 | 1/1999 |
| WO | WO 97/16796 A1 | 5/1997 |
| WO | WO 01/63837 A2 | 8/2001 |
| WO | WO 2005/046184 A1 | 5/2005 |

OTHER PUBLICATIONS

Nagami et al., "Toshiba's Flow Attribute Notification Protocol (FANP) Specification," Apr. 1997, RFC 2129, Internet RFC/STD/FYI/BCP Archives [online], [retrieved on May 16, 2002]. Retrieved from the Internet: <landfield.com/rfcs/rfc2129.html>, 16 pages.

Strom et al., "Gryphon: An Information Flow Based Approach to Message Brokering," International Symposium on Software Reliability Engineering '98, 1998, 2 pages.

Sturman et al., "Reflection in the Gryphon Message Brokering System," Reflection Workshop of the 13.sup.th ACM Conference on Object Oriented Program Systems, Languages and Applications (OOPSLA '98), 1998, 5 pages.

International DOI Foundation, "Introduction to the Digital Object Identifier," [online]. Apr. 1998 [retrieved on May 16, 2002]. Retrieved from the Internet: <doi.org/introduction.html.>, 4 pages.

Aksoy et al., "Research in Data Broadcast and Dissemination", Proc. 1st Int'l Conf. on Advanced Multimedia Content Processing, Osaka University, Osaka, Japan, Nov. 1998.

Banavar et al., "An Efficient Multicast Protocol for Content-Based Publish-Subscribe Systems," Proc. of the 19th International Conference on Distributed Computing Systems, 1999, 9 pages.

Banavar et al., "Information Flow Based Event Distribution Middleware," Proceedings of the 1999 ICDCS Workshop on Electronic Commerce and Web-Based Applications, 1999, 8 pages.

Aguilera et al., "Matching Events in a Content-based Subscription System," Eighteenth ACM Symposium on Principles of Distributed Computing (PODC '99), Atlanta, GA, May 4-6, 1999, 9 pages.

Banavar et al., "A Case for Message Oriented Middleware," Distributed Computing, 13.sup.th International Symposium, Bratislava, Slavak Republic, Sep. 27-29, 1999, 18 pages.

Aguilera et al., "Efficient Atomic Broadcast Using Deterministic Merge," Symposium on Principles of Distributed Computing, 2000, 10 pages.

Opyrchal et al., "Exploiting IP Multicast in Content-Based Publish-Subscribe Systems," Proceedings of the IFIP/ACM International Conference on Distributed Systems Platforms (Middleware 2000), Apr. 2000, 23 pages.

Caplin Systems Ltd., White Paper "Real Time Text Protocol (RTTP)," Version 1.1, Sep. 2000, 11 pages.

Reuters, "Reuters Market Data Systems and the Trading Solutions Architecture," Version 1.0, Jan. 12, 2001, 51 pages.

Ramamrithan et al., "Dissemination of Dynamic Data on the Internet," [online]. Powerpoint Presentation, Spring 2001, [retrieved on Feb. 6, 2002], 5 pages. Retrieved from the Internet <.cs.umbc.edu/courses/graduate/CMSC691T/spring.sub.—2001/rlist/amit.ppt>.

ComputerLetter, vol. 17, No. 23, Jul. 16, 2001, pp. 1-8.

ComputerLetter, vol. 17, No. 31, Sep. 24, 2001, pp. 1-6.

ComputerLetter, vol. 17, No. 35, Nov. 5, 2001, pp. 1-6.

Tuttle et al., "Upstream Delivery of Information in a Digital Network", U.S. Appl. No. 09/901,582, filed Jul. 9, 2001.

"Repackaging the Net", ComputerLetter, vol. 17, No. 35, Nov. 5, 2001, pp. 1-5.

"Reckoning with IP", ComputerLetter, vol. 17, No. 37, Nov. 19, 2001, pp. 1-6.

"Persistence Counts", ComputerLetter, vol. 17, No. 23, Jul. 16, 2001, pp. 1, 5-7.

Zhao et al.; "A Workflow-centric Study of Organizational Knowledge Distribution;" Proceedings of the 33rd Hawaii International Conference on System Sciences; 2000; pp. 1-10; IEEE.

Gribble, et al.; "The Ninja Architecture for Robust Internet-scale Systems and Services;" Computer Networks; 2001; pp. 473-497; vol. 35; Elsevier Science B.V.

Carmona, David; "Programming the Thread Pool in the .NET Framework"; 'Online' Jun. 2002, pp. 1-17, XP002357234; retrieved on Dec. 1, 2005 from the Internet: URL:http://msdn.microsoft.com/library/default.asp?url=/library/en-us/dndotnet/hmtl/progthrepool.asp>, pp. 1-17.

Welsh, Matthew D.; "An Architecture for Highly Concurrent, Well-Conditioned Internet Services"; URL: http://www.eecs.harvard.edu/{mdw/papers/mdw-phdthesis/pdf>, 2005, pp. 48-54, 101, and 113-114.

Written Opinion of the International Searching Authority for International Application No. PCT/US2005/029162, recorded Jan. 17, 2006, 7 pages.

Written Opinion of the International Searching Authority for International Application No. PCT/US2005/029021, recorded Dec. 14, 2005, 10 pages.

Written Opinion of the International Searching Authority for International Application No. PCT/US2005/029158, recorded Jan. 25, 2006, 7 pages.

Non-Final Office Action dated Oct. 26, 2009, U.S. Appl. No. 11/205,263, Rumelhart et al., filed Aug. 15, 2005.

Final Office Action dated Nov. 24, 2009, U.S. Appl. No. 11/205,237, Rumelhart et al., filed Aug. 15, 2005.

Non-Final Office Action dated May 3, 2005, 8 pages in U.S. Appl. No. 10/017,182, Tuttle et al., filed Dec. 14, 2001.

Notice of Allowance dated Jan. 3, 2006, U.S. Appl. No. 10/105,018, Tuttle et al., filed Mar. 21, 2002.

Notice of Allowance dated Jul. 5, 2006, U.S. Appl. No. 10/105,018, Tuttle et al., filed Mar. 21, 2002.

Non-Final Office Action dated Aug. 9, 2005, U.S. Appl. No. 10/213,269, Cano et al., filed Aug. 5, 2002.

Final Office Action dated Jan. 26, 2006, U.S. Appl. No. 10/213,269, Cano et al., filed Aug. 5, 2002.

Notice of Allowance dated Jun. 6, 2006, U.S. Appl. No. 10/213,269, Cano et al., filed Aug. 5, 2002.

Non-Final Office Action dated Feb. 3, 2009, U.S. Appl. No. 11/205,233, Rumelhart et al., filed Aug. 15, 2005.

Non-Final Office Action dated Aug. 6, 2009, U.S. Appl. No. 11/205,233, Rumelhart et al., filed Aug. 15, 2005.

Non-Final Office Action dated Apr. 22, 2008, U.S. Appl. No. 11/205,237, Cameros et al., filed Aug. 15, 2005.

Non-Final Office Action dated Apr. 29, 2009, U.S. Appl. No. 11/205,237, Cameros et al., filed Aug. 15, 2005.

Final Office Action dated Nov. 25, 2008, U.S. Appl. No. 11/205,237, Cameros et al., filed Aug. 15, 2005.

Notice of Allowance dated May 22, 2007, U.S. Appl. No. 11/347,802, Tuttle et al., filed Feb. 3, 2006.

Non-Final Office Action dated Jan. 26, 2007, U.S. Appl. No. 11/347,802, Tuttle et al., filed Feb. 3, 2006.

Non-Final Office Action dated Mar. 6, 2009, U.S. Appl. No. 11/515,233, Rumelhart et al., filed Aug. 31, 2006.

Final Office Action dated Oct. 7, 2009, U.S. Appl. No. 11/515,233, Rumelhart et al., filed Aug. 31, 2006.

Non-Final Office Action dated Jan. 7, 2010, U.S. Appl. No. 11/205,233, Rumelhart et al., filed Aug. 15, 2005.

Non-Final Office Action dated Feb. 22, 2010, U.S. Appl. No. 11/515,233, Rumelhart et al., filed Aug. 31, 2006.

Final Office Action dated Mar. 23, 2010, U.S. Appl. No. 11/205,263, Rumelhart et al., filed Aug. 15, 2005.

U.S. Appl. No. 13/617,168, Tuttle et al., "Asynchronous Messaging Using A Node Specialization Architecture in the Dynamic Routing Network," filed Sep. 14, 2012.

Non-Final Rejection mailed Aug. 9, 2005 for U.S. Appl. No. 10/213,269, filed Aug. 5, 2002; 11 pages.

Final Rejection mailed Jan. 26, 2006 for U.S. Appl. No. 10/213,269, filed Aug. 5, 2002; 8 pages.

Notice of Allowance mailed Jun. 6, 2006 for U.S. Appl. No. 10/213,269, filed Aug. 5, 2002; 4 pages.

Non-Final Rejection mailed Aug. 26, 2010 for U.S. Appl. No. 11/515,366, filed Aug. 31, 2006; 16 pages.

Final Rejection mailed Feb. 17, 2011 for U.S. Appl. No. 11/515,366, filed Aug. 31, 2006; 30 pages.

Notice of Allowance mailed Nov. 10, 2005 for U.S. Appl. No. 10/017,182, filed Dec. 14, 2001; 6 pages.

* cited by examiner

Local Sports Scores

SF 49ers         42  ← 416
STL Rams          7
         ↑
        414

Oakland Raiders  24
Dallas Cowboys    3

SF Giants         6
LA Dodgers        0

Oakland A's       9
Texas Rangers     2

410

---

Baseball Scores

SF   6     Oak   9
LA   0     Tex   2

Football Scores

SF   42    Oakland  24
STL   7    Dallas    3
   ↑         
  416
  418

ASYNCHRONOUS MESSAGING USING A NODE SPECIALIZATION ARCHITECTURE IN THE DYNAMIC ROUTING NETWORK

CROSS-REFERENCE TO RELATED APPLICATIONS

This application is a continuation of U.S. application Ser. No. 10/105,018 filed Mar. 21, 2002 (now U.S. Pat. No. 7,051, 070), which is a continuation-in-part of U.S. application Ser. No. 10/017,182 filed Dec. 14, 2001 now U.S. Pat. No. 7,043, 525, which claims the benefit of U.S. Provisional Application No. 60/256,613, filed Dec. 18, 2000, U.S. Provisional Application No. 60/276,847, filed Mar. 16, 2001, U.S. Provisional Application No. 60/278,303, filed Mar. 21, 2001, U.S. Provisional Application No. 60/279,608, filed Mar. 28, 2001, and U.S. Provisional Application No. 60/280,627, filed Mar. 29, 2001, all of which are hereby incorporated by reference herein.

BACKGROUND

1. Field of the Invention

This invention pertains in general to transferring information through digital networks and in particular to transferring information for remotely updating content at client devices through the digital networks.

2. Background Art

The Internet is a digital network of computers. An individual computer on the Internet is typically identified by an internet protocol (IP) address. A computer on the Internet sends a packet of information to another computer by routing the packet to a logical port at the destination computer's IP address. The destination computer interprets the packet according to one of several possible protocols determined by the port to which the packet was sent.

The World Wide Web (the "Web") is a collection of technology and content available on the Internet that allows the content to be routed from server computers to particular destination computers. The Web includes a large number of web pages residing on many different servers. Web pages contain one or more files, or references to one or more files, specifying instructions for presenting the web page and content, such as text, images, applets, video, and/or audio.

Web pages use a variety of definitional and programming languages to control how information is presented. The most fundamental of these is the Hypertext Markup Language (HTML). HTML uses a system of "tags" to specify how content should be displayed. Recent advances in HTML introduce "style sheets" which help separate content information from display information. HTML has also been modified and extended to provide new capabilities. For example, Extensible Markup Language (XML) adds semantic content to web pages. In addition, Dynamic HTML (DHTML) adds some dynamic content to web pages.

A web page may also include one or more programs for controlling how the web page is displayed. For example, JAVA® applets and JAVASCRIPT® scripts may be used to control the display of a web page. In addition, DHTML uses scripts to control the dynamic content. Thus, a web page designer can use applets and scripts to produce animation effects or modify the display based on user interaction. For example, the designer can write a script that changes the color of a piece of text when a user clicks on a button.

Devices that display/execute web pages are often called "client devices" or simply "clients." Client devices include personal computers, web-enabled set-top boxes and televisions, cellular telephones, personal digital assistants and other handheld devices, and special-purpose web-browsing appliances. Client devices typically employ a program called a "web browser" for interpreting the HTML or other display instructions in the web page and displaying the content accordingly. Most web browsers include special functionality, such as a Java Virtual Machine, for executing JAVA® applets and/or other applets or scripts embedded in the web pages.

A client device specifies a web page or other document on the web using a Uniform Resource Locator (URL). A URL has the form "service://server/path/file." Here "service" refers to the protocol to be used, such as the file transfer protocol (FTP) or the hypertext transport protocol (HTTP). "Server" is the IP address of the server containing the page, and "path/file" specifies the particular web page on the server.

The Web suffers from a substantial limitation with respect to dynamically updating content in a web page at a client device. The Web's only mode of operation is for a client device to first request a page from a server and then for the server to send the requested page to the client device. Once the server delivers the page to the client, it typically terminates its connection to the client, and does not retain any information about the client or the page that was sent. For this reason, servers are typically "stateless." As a result, client devices drive and control the flow of information around the Web. While client-side control is appropriate in some situations, it does not permit efficient updating of data at the client devices. For example, if a web page contains information that may change, such as the score of a baseball game or a stock quote, the server has no way to inform the client devices that are viewing the page of the change. Instead, the client devices must ask the server for the updated information. However, the client devices do not know when the information on the web page has changed, and thus do not know to ask for the update.

There are some simple web programming techniques that attempt to update content on client device-side web pages. One approach that web designers use is to rely on the client devices to periodically re-request web pages. This updating can be performed as the result of user action (such as pressing the "refresh" button) or can be automated to occur on a particular schedule (such as by using the HTML Meta Refresh tag to cause the client device to request the page every 'X' seconds). Although this technique provides client devices with more up-to-date information, it is very wasteful of resources. In particular, the web server must resend the page even if nothing has changed, and, even when something has changed, it must resend the entire web page rather than just the updated information, which may be only a very small part of the page. Further, attempting to reduce unnecessary requests by decreasing the request rate results in decreasing the currency of the data. This is an unalterable trade off in a client-driven approach.

The performance of automatic refreshing can be improved somewhat by putting information that may change in a separate frame from information that is less likely to change, and only refreshing the separate frame. A few web designers even write custom JAVA applets to limit refreshing to individual components on a page, such as the score of a soccer game. A willingness to go to such effort illustrates the serious drain of resources caused by frequent refreshing. Nevertheless, even custom JAVA applets are not a meaningful attack on this problem. Custom applets require a large separate development effort for each item on each page that might need to be updated. More importantly, most custom applets still update content based upon client-driven requests, although it is possible to design an applet that accepts "pushed" messages. This solution is not scalable to provide updated information for large numbers of client devices and for large numbers of web pages.

Therefore, there is a need in the art for an efficient way to provide dynamic content to a web page at a client device.

DISCLOSURE OF THE INVENTION

The above need is met by a dynamic content routing network that routes messages containing data for updating properties of live objects to clients displaying web pages or other representations of data containing the live objects. The web server that initially provides the web pages to the clients does not need to track which clients are currently displaying the live objects. Instead, the information provider or a dynamic content provider (generically referred to as an "input source") that provided the live object simply sends an update message to the routing network. This routing utilizes bandwidth efficiently because the update messages are provided to the clients only when the live objects change.

The routing network is adapted to selectively send messages to the nodes in the network. In one embodiment, a hierarchy of registrations is used. Each gateway in the routing network maintains the mappings between the live: objects and the nodes that have registered for the live objects. Each node in the routing network, in turn, maintains the mappings between the live objects and the clients that display them. An input source provides a message to a gateway in each cluster in the routing network. Each gateway forwards to each node only messages that reference the objects for which it has registered. Each node forwards to each client only messages that reference the objects for which it has registered. Adding node functionality to the gateway and client functionality to the node advantageously allows the routing network to decide which nodes should receive an update message. As a result, messages are sent to only nodes that have registered for the messages. Furthermore, each node receives all the messages that the clients connected to that node are interested in.

In another embodiment, all messages from an input source are assigned to one or more of N categories. Also, the nodes are assigned to one or more of M types, and mappings are created between message categories and node types. Each gateway keeps track of these mappings. When a gateway receives messages from input sources, the gateway identifies the categories of the messages and routes the messages to the nodes of the types to which the categories are mapped. To ensure that clients have access to the messages they need, clients are allowed to communicate with nodes of several types using client proxies connected between the clients and the nodes. There are at least two ways to implement the client proxy embodiment. The implementations differ primarily in where the client registration information is stored. In the first implementation, client registration information is stored at the nodes, and the client proxy merely passes messages among the clients and nodes. When a node directs a message to the client, the node passes the message to the client proxy along with a pointer to the client socket. When the client proxy receives the message, it simply pushes it to the client socket.

In the second implementation of the client proxy embodiment, the client proxy stores client registration information. In this embodiment, each node stores the object IDs registered by client proxies connected to the node. The client proxy registers with the nodes for all objects for which it needs to receive updates. The nodes receive the messages from the input sources, determine which client proxies have registered for the messages, and send the messages to the appropriate client proxies. The client proxies, in turn, transmit the messages to the clients that have registered for the messages.

The features and advantages described in this summary and the following detailed description are not all-inclusive, and particularly, many additional features and advantages will be apparent to one of ordinary skill in the art in view of the drawings, specification, and claims hereof.

BRIEF DESCRIPTION OF THE DRAWINGS

FIG. 4 illustrates two different web pages containing sports scores;

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
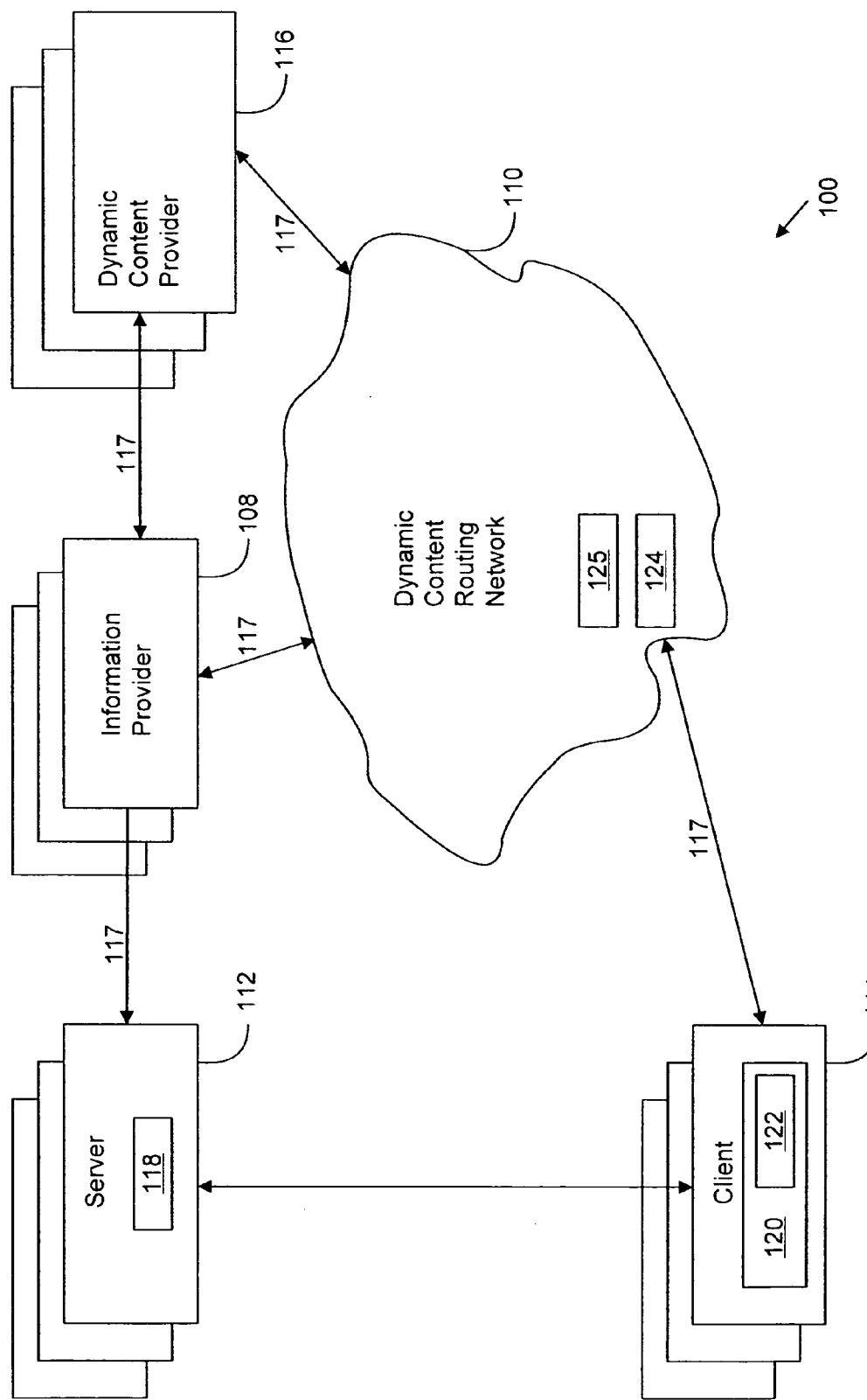
FIG. 1 is a high-level block diagram illustrating an environment containing a dynamic content routing network.

FIG. 1 is a high-level block diagram illustrating an environment 100 containing a dynamic content routing network 110 (hereafter referred to as the "routing network"). The environment 100 also contains a server 112 in communication with a client 114, an information provider 108, and a dynamic content provider 116. Although a typical environment 100 will have hundreds of servers 112 and information providers 108, thousands (or even millions) of clients 114, and multiple dynamic content providers 116, FIG. 1 illustrates only one of each of these entities in order to enhance the clarity of this description.

The server 112, client 114, information provider 108, dynamic content provider 116, and routing network 110 are preferably in communication via conventional communications links 117 such as those comprising the Internet. The communications links 117 include known wired communications media, such as dedicated or shared data, cable television or telephone lines, and/or known wireless communications media, such as communications over the cellular telephone network using protocols such as the global system for mobile communications (GSM), code division multiple access (CDMA), time division multiple access (TDMA), etc.

In one embodiment, the entities may each be in communication with one or more Internet Service Providers (ISPs) (not shown) that provide each entity with access to other computers on the Internet. In addition, the server 112, client 114, information provider 108, dynamic content provider 116, and routing network 110 are preferably each identified by at least one Internet Protocol (IP) address such as "66.35.209.224." The IP address may also have one or more domain names associated with it, such as "bangnetworks.com." Alternative embodiments of the present invention may use alternative addressing schemes and/or naming conventions instead of, or in addition to, those described herein. For example, embodiments wherein one or more of the clients are cellular telephones or other portable devices may rely on different addressing schemes.

Preferably, the information provider 108 provides web pages or other representations of data to the server 112. The web pages contain one or more "live objects," which are designated to be real-time dynamically-updateable objects. Each live object is identified by an object identifier, or object ID. Preferably, the server 112 provides the web pages 118 to multiple clients 114. The clients 114 contact the routing network 110 and register for update messages for the object IDs on the web page. The routing network 110, in turn, preferably maintains a registry indicating which clients have registered for which object IDs.

The information provider 108 and/or dynamic content provider 116 send update messages to the routing network 110. These messages can be sent any time the information provider 108 or dynamic content provider 116 wants to update a property of a live object. Each update message preferably identifies a live object and contains data for updating a property of the identified live object. The routing network 110 accesses the registry and determines which clients have registered for the identified object. Then, the routing network 110 routes the update message to the appropriate clients. Upon receipt of an update message, the clients 114 update the specified property of the live object.

The routing network 110 provides an efficient one-to-many mapping of objects to clients (and by inference of information, a many-to-many mapping of information providers 108/dynamic content providers 116 to clients) through object-based routing. Messages provided by the information provider 108 and/or dynamic content provider 116 to the routing network 110 are not routed to the clients 114 based entirely on a specified destination; more specifically, they are not routed based on the IP address of the client, as in conventional IP routing schemes. Instead, the messages are routed based on the live objects referenced by the message.

The mapping and object-based routing provided by the routing network 110 allow the information provider 108 and dynamic content provider 116 to update properties of live objects at a dynamically changing cross-section of clients in real-time, without requiring the information provider or dynamic content provider to track the clients or web pages being viewed by the clients. The clients 114, in turn, do not need to have any a priori knowledge of object IDs—they "discover" which IDs they should register when they receives the web pages 118 from the server 112.

Object-based routing also allows information providers 108 to dynamically update content on web pages without requiring the clients 114 to re-request the content, and without requiring the information providers 108 or servers 112 to maintain connections with the clients. In this manner, significantly more clients can receive updated content from a given information provider 108 than would be possible utilizing conventional client-side request-driven transmission control protocol/Internet Protocol (TCP/IP) connections between the clients and the server 112.

Turning now to the individual entities illustrated in FIG. 1, the server 112 is preferably a conventional computer system configured to act as a web server and serves web pages 118 and other data representations to clients 114. The web pages 118 provided by the server 112 are associated with one or more information providers 108.

An information provider 108 is an entity providing one or more web pages 118, information contained in web pages, and/or other representations of data served by the server 112. The information provider 108 preferably has a conventional computer system coupled to the Internet. In one embodiment, the server 112 is directly controlled by the information provider 108 (e.g., the server is physically located at the information provider and/or is dedicated to serving only the information provider's web pages). In this embodiment, the server 112 and information provider 108 can be treated as the same entity. In an alternative embodiment, the server 112 serves web pages from multiple information providers.

As is known in the art, the web pages 118 and other content on the server 112 are specified by uniform resource locators (URLs) having the form "service://server/path/web page." Typically, web pages 118 are obtained via the hypertext transport protocol (HTTP) and thus an exemplary URL for retrieving the web page "b1.html" from the web server having the domain name "www.bangnetworks.com" is "http://www.bangnetworks.com/news/b1.html."

As used herein, a "web page" is a block of data available from the server 112. In the simplest case, a web page is a file written in the hypertext markup language (HTML). The web page may also contain or refer to one or more other blocks of data, such as other files, text, images, applets, video, and/or audio. In addition, the web page may contain instructions for presenting the web page and its content, such as HTML tags and style sheets. The instructions may also be in the Extensible Markup Language (XML), which is related to HTML and adds semantic content to web pages or the Dynamic HTML (DHTML), which adds some dynamic content to web pages. Additionally, the instructions may take the form of one or more programs such as JAVA® applets and JAVASCRIPT® and/or DHTML scripts.

As used herein, the phrase "web page" also refers to other representations of data served by the server 112 regardless of whether these data representations include characteristics of conventional web pages. These data representations include, for example, application programs and data intended for the web browser 120 or other application programs residing at the clients 114 or elsewhere, such as spreadsheet or textual (e.g., word processing) data, etc.

In a preferred embodiment, objects at the client, such as web pages and elements of web pages, can be designated as "live" by the information provider 108. Properties of a live object can be dynamically updated in real-time at the client 114 by the information provider 108 or another entity acting on behalf of the information provider. As used herein, an "object" is any datum or data at the client 114 that can be individually identified or accessed. Examples of objects include elements of web pages such as text characters and strings, images, frames, tables, audio, video, applets, scripts, HTML, XML, and other code forming the web page, variables and other information used by applets, scripts and/or code, URLs embedded in the web page, etc. Application and operating system constructs are also objects. For example, cells of spreadsheets, text in word processor documents, and title bars and messages displayed by the operating system or applications are objects. Preferably, multiple objects can be grouped together into a single, logical object. Thus, an object can be defined at any desired or useful level of granularity.

Since content on a web page is conceptualized and organized by "object," the present invention essentially abstracts web pages and web page content, and other modules and/or functionality at the client 114, away from the HTML code or other conventional representation. This abstraction allows the information provider 108 to update a property of an object without concern for the location, display format, or other specifics of how the data is being represented at the client 114.

Live objects have associated "properties" which include any modifiable data related to the object or referenced with respect to the object. The information provider 108 typically, but not necessarily, provides initial settings for the properties of live objects provided to the client 114. The properties may or may not affect the visual representation of the object in the web page or other data representation. A property may affect an internal aspect of the object and, thus, a change to the property may not have any direct effect on a web page containing the object. For example, the property may affect whether particular aspects of the object are modifiable, how the object responds to user input or other stimuli, etc. Additionally, a property may also have a direct effect on how the object is displayed at the client 114. For example, the property may affect the content, color, typeface, size, formatting, or other attribute of text, images, or other data displayed by the object. Other properties may occupy parts of the spectrum between having no effect on the visible representation of the object and having a direct effect on the visible representation of the object. For example, a web page showing scores of football games may include a list of games and the current scores of the games as of the time the server 112 serves the web page. The list of games, subset of games to be displayed, and the scores of the games can be designated as live objects (or properties of a single live object) and updated as necessary or desired.

A property can also preferably include instantiating an instance of the object or invoking functionality of the object. For example, a property of a browser window object may include functionality for instantiating another browser window. This function can be invoked as a logical change to a property of the object. The second browser window can be referenced through the original browser window (i.e., object) or designated as a new live object.

An information provider 108 or other entity preferably updates a live object at a client 114 via an update message. In general, an update message identifies the live object and, if necessary, the property of the live object, and contains data for updating the property. In one embodiment, the data may be the actual value for the property or executable code for causing the object's property to be updated. For example, the data may be a simple numerical or textual value, e.g., "4," to which the property should be set, and/or the data may be JAVASCRIPT® code or a call to a JAVASCRIPT® function at the client that effects the desired change to the property of the object.

The update message preferably implicitly or explicitly identifies a handler at the client 114 for use in updating the live object's property. In one embodiment, the client 114 utilizes a default handler when the message implicitly specifies the handler (e.g. when the message does not identify a specific handler). In one embodiment, if the update message specifies the actual value for the property, a default handler generates JAVASCRIPT® code for changing the property to the specified value. If the data in the update message are JAVASCRIPT® code, the default handler does not perform any processing of the code. In either case, the default handlers preferably use LiveConnect to execute the JAVASCRIPT® code in a Java Virtual Machine (JVM) 122 at the client 114 and thereby update the property of the live object.

For certain objects and/or data types, the default handlers are not appropriate. In these cases, the message preferably explicitly identifies a handler for performing the update. For example, the message may explicitly specify a function to call on the data or the message may explicitly identify the environment in which the data should be executed. For example, the data in the update message may include code for execution by a software "plug-in" such as MACROMEDIA FLASH® and the message may explicitly identify FLASH as the handler.

The information provider 108 preferably designates an object as "live" by including a unique identifier for the object, the object ID, in the web page or other data representation provided to the client 114. In one embodiment, the information provider 108 encodes the object ID in an object's corresponding HTML "ID" attribute using the following HTML expression:

ID="elementIdentifier,"

where "elementIdentifier" is the object ID and is preferably a string. The string can encode any information desired by the information provider 108 or other entity establishing the object ID and in one embodiment is a simple textual and/or numeric identifier. In one embodiment, the information provider 108 begins the object ID with a predefined token, such as "Bang$," in order to distinguish live objects from other objects that happen to have defined ID attributes. For example, an object can have the object ID "Bang$elementIdentifier."

In the preferred embodiment, each information provider 108 optionally encodes a unique information provider ID in its object IDs in order to prevent naming collisions between the object IDs of different information providers. In one embodiment, the information provider ID is a textual and/or numeric identifier. The information provider 108 may specify the information provider ID and the object ID as part of a hierarchical namespace. For example, in one embodiment objects are named as follows: "$namespace1$ [namespace2$ . . . $namespaceN$]objectId," where "$namespace1" is the information provider ID and the "$" operates as the name separator and defines additional optional levels of a namespace hierarchy. One embodiment of the system 100 supports typical directory services functionality. For example, two dollar sign characters appearing together, "$$," refers to the top level of the namespace hierarchy.

Thus, the object ID for a live object is preferably formed from a combination of the predefined token, the information provider ID namespace, and a value assigned by the information provider 108. For example, the object ID for a live object representing the real time price of a stock having the symbol "BANG" might be: "Bang$$informationProviderID-$equities$realtime$bang." In this example, "Bang$" is the predefined token that signifies a live object, "$information-ProviderID" is the ID identifying the information provider, "$equities$realtime$" defines levels of a namespace hierarchy, and "bang" identifies the specific object.

In some embodiments and situations, the object ID utilizes relative names. For example, an information provider 108 referring to its own object IDs is implicitly in its own namespace. Accordingly, the information provider 108 does not need to include the information Provider ID in the object IDs it utilizes internally. In one embodiment, the information provider ID is not explicitly encoded into the object ID. Instead, the information provider ID is encoded elsewhere in the web page in order to provide scope to the page's object IDs.

In one embodiment, the object ID identifies a point (i.e., a node in a tree) in a Document Object Model (DOM) representation of a web page or other document at the client 114. The DOM is a platform- and language-neutral interface that represents a document as a hierarchy of objects. The DOM also provides an interface that allows programs and scripts to dynamically access and update properties of the objects. Object properties can be inherited by descendent objects.

In this embodiment, the client 114 preferably executes an update message in the context of the specified point in the DOM representation. The update may specify a change to a property of the object at the identified point. The update also may specify a change to a parent or descendent of the object at the identified point. In each case, the update is executed relative to the specified point in the DOM representation. In one embodiment, points in the DOM representation specify how to update properties of live objects located at those points. Thus, the same update may be interpreted differently depending upon the identified live object's location in the DOM representation.

For example, assume there is an object in the DOM representation identified as "window.document.frame[3].ObjectID." Also assume that the object has an "innerText" property located at "window.document.frame[3].ObjectID.innerText" that specifies the text displayed by the object. An update message can change the text displayed by the object by specifying "ObjectID" and the new value for the innerText property.

An advantage of utilizing object IDs to specify objects is that the information provider 108 or other entity providing the update message can access and change properties of objects without knowing the object's actual location in the DOM representation. Indeed, the object may be in different locations in different DOM representations and/or in multiple locations in the same DOM representation. In any of these cases, the update message will change the specified properties of all of the objects having the given object ID.

Depending upon the particular embodiment of the environment 100, the information provider 108 and/or the dynamic content provider 116 provides update messages to the routing network 110. The dynamic content provider 116 is preferably a conventional computer system operated by an entity that provides real-time information, such as stock prices and/or sports scores. In one embodiment, the information provider 108 receives updated properties for the live objects from the dynamic content provider 116 or another source (or generates the updated properties internally). Then, the information provider 108 sends an update message specifying the object ID and the change to the object property to the routing network 110. In this embodiment, the dynamic content provider 116 may be absent from the environment 100.

In another embodiment, the dynamic content provider 116 provides the object IDs for live objects to one or more information providers 108 and the information providers 108 distribute the live objects to the clients 114. Then, the dynamic content provider 116 sends messages specifying the changes to the properties of the live objects to the routing network 110. For example, the dynamic content provider 116 distributes an object ID associated with the score of a particular baseball game to the information providers 108. Then, the dynamic content provider 116 sends a message specifying the object ID and an update to a property of the object that controls the displayed score of the particular baseball game to the routing network 110. These two embodiments are not mutually exclusive and, therefore, some updates may be provided to the routing network 110 by the information provider 108 while others are provided by the dynamic content provider 116.

The client 114 is a device that retrieves web pages 118 and/or other information from the server 112. In one embodiment, the client 114 is a conventional personal computer used by a person to access information on the Internet. In alternative embodiments, the client 114 is a different consumer electronic device having Internet connectivity, such as an Internet-enabled television, a cellular telephone, a personal digital assistant (PDA), a web browsing appliance, etc. The client 114 preferably, but not necessarily, has an associated display device.

The client 114 preferably executes a web browser 120, such as MICROSOFT INTERNET EXPLORER®, for retrieving web pages and displaying them on the display device. In embodiments where the client receives data representations from the server 112 other than conventional web pages, the web browser 120 does not necessarily share similarities with conventional web browsers. Preferably, the web browser 120 contains a JVM 122 for executing JAVA® applets and/or scripts. The web browser 120 also preferably contains Dynamic HTML capabilities, such as support for JAVASCRIPT® (or another scripting language, such as VBScript) and the Document Object Model (DOM), and enables communications between JAVA® and the scripting languages. In one embodiment, the web browser 120 supports the LiveConnect standard for enabling communication between JAVA® applets and scripts written in the supported scripting languages. The web browser 120 can also be extended through software plug-ins such as MACROMEDIA FLASH®, REAL NETWORKS REALPLAYER®, and/or APPLE QUICKTIME®. In alternative embodiments, the functionality of the JVM 122 and/or other aspects of the web browser 120 are provided by one or more other functional units within the client 114. The term "module" is used herein to refer to software computer program code and/or any hardware or circuitry utilized to provide the functionality attributed to the module. The web browser 120 and JVM 122 are examples of modules in the client 114.

In some embodiments, the client 114 does not necessarily have a display device, web browser 120 and/or other components associated with a typical consumer device. The client 114, for example, may be a dedicated purpose device having certain aspects of web connectivity such as an embedded HTTP client in a web-enabled appliance or in a controller for an automobile, audio-visual equipment, or some other device.

A web page 118 provided from the server 112 to the client 114 preferably includes instructions for enabling the live objects on the web page. The instructions cause the client 114 to automatically and transparently (i.e., without user interaction) contact the routing network 110 and download an activation module 124 for activating the live objects. In one embodiment, the instructions comprise a URL specifying the location of the activation module 124 at the routing network 110. In an alternative embodiment, the client 114 obtains the activation module 124 from the server 112 or another source.

The activation module 124 preferably contains JAVA® instructions for execution by the JVM 122. However, alternative embodiments of the module 124 may encode the instructions in the web page 118 and/or the activation module 124 using different languages and/or techniques. For example, the instructions and/or activation module 124 can be embedded in the web browser 120 or operating system, either as native code or as plug-ins. In these alternative embodiments, the web browser 120 does not have to download the activation module 124 from an external source.

The activation module 124 preferably registers object IDs from the web page 118 downloaded by the client 114 with the routing network 110 and updates the live objects in response to update messages received from the network. The routing network 110 records the registrations in the registry 125. The client's registrations preferably remain in effect as long as the client is displaying the associated web page 118, although other embodiments of the system 100 may use different criteria for determining when to terminate the client's registrations.

Figure 2:
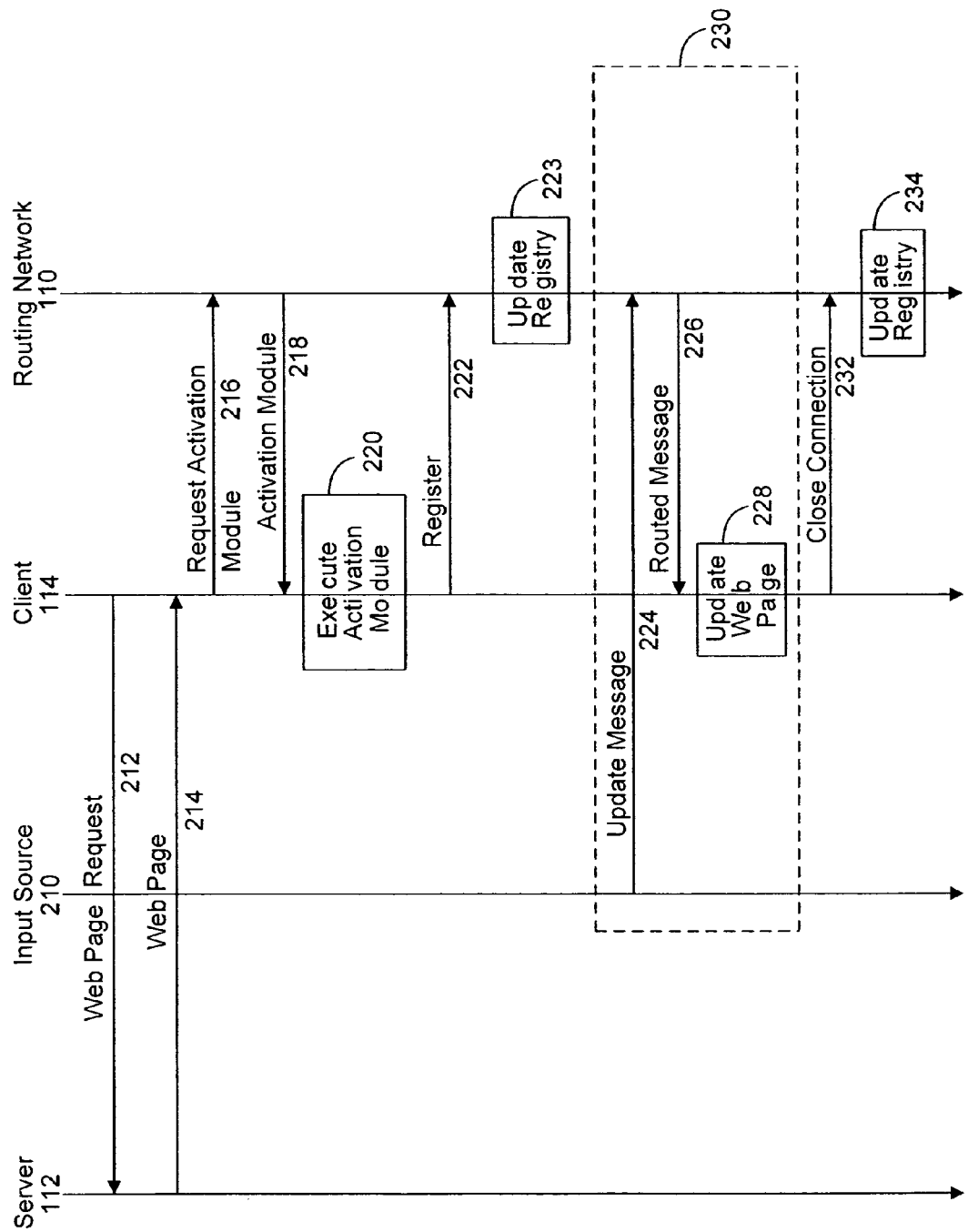
FIG. 2 is an interaction diagram illustrating interactions among a server, information provider, dynamic content provider, client, and routing network to update a property of a live object on a web page.

FIG. 2 is an interaction diagram illustrating interactions among the server 112, information provider 108/dynamic content provider 116 (generically referred to as an "input source 210"), client 114, and the routing network 110 to update a property of a live object. Initially, the client 114 sends 212 a web page request to the server 112. In response, the server 112 provides 214 to the client 114 the web page containing or otherwise identifying the one or more live objects. Instructions encoded in the web page preferably cause the client 114 to transparently request 216 the activation module 124 from the routing network 110. In response, the routing network 110 sends 218 the activation module 124. The client 114 executes 220 the activation module 124, which identifies the object IDs of the live objects at the client and registers 222 the object IDs with the routing network 110. The routing network 110 updates 223 its registry to identify the object IDs for which the client 114 has registered.

At some point, the input source 210 sends 224 an update message to the routing network 110 in order to change a property of a live object at the client 114. In one embodiment, the message from the input source 210 to the routing network 110 contains only a single object ID and an update to a property of the identified object. In another embodiment, the message contains multiple object IDs and the corresponding property updates. In this latter embodiment, the message may have an associated "Batch ID" that identifies the message as having multiple object IDs and updates. Preferably, the information provider 108 can include a batch ID in a web page 118 in the same manner as including an object ID. Likewise, the client 114 can preferably register for a batch ID with the routing network 110 in the same manner as an object ID. In fact, the batch ID can be the same as the object ID so that the client 114 registers for both batch and non-batch messages by registering one ID. Alternatively, separate procedures can be established for registering batch messages. The client 114 preferably processes the component messages of a batch as if each message were delivered separately.

The routing network 110, in turn, routes 226 the message to each client 114 that has registered for the specified object ID, preferably by utilizing standard Internet communications protocols, such as IP addresses, etc. The activation module 124 at the client 114 processes the message and updates 228 the property of the identified live object. If live objects having the same object ID appear in multiple locations at the client 114 (e.g., at multiple locations on a web page being displayed at the client), the activation module 124 preferably updates each of the live objects having the specified ID. As a result, the routing network 110 allows live objects at the client 114 to be dynamically updated. Preferably, this routing and updating happens quickly enough to be considered "real-time" for the purposes of the input source 210.

This update process, indicated within the dashed box 230 in FIG. 2, can repeat an indefinite number of times and is fully asynchronous as to the information provider 210 and client 114. For example, the input source 210 may send regular update messages to the routing network 110 as the score of a sporting event changes or a stock price fluctuates, but may stop sending update messages once the sporting event ends or stock market closes. When the client 114 ends the display of a web page containing the live object, or otherwise no longer desires to receive update messages, the client preferably closes 232 the connection with the routing network 110. The routing network 110, in turn, updates 234 the registry 125 to remove the client's object registrations. In another embodiment, the client 114 sends messages to the routing network 110 that selectively register and/or de-register the client from one or more objects yet leaves the connection open in order to receive update messages pertaining to other objects.

Figure 3:
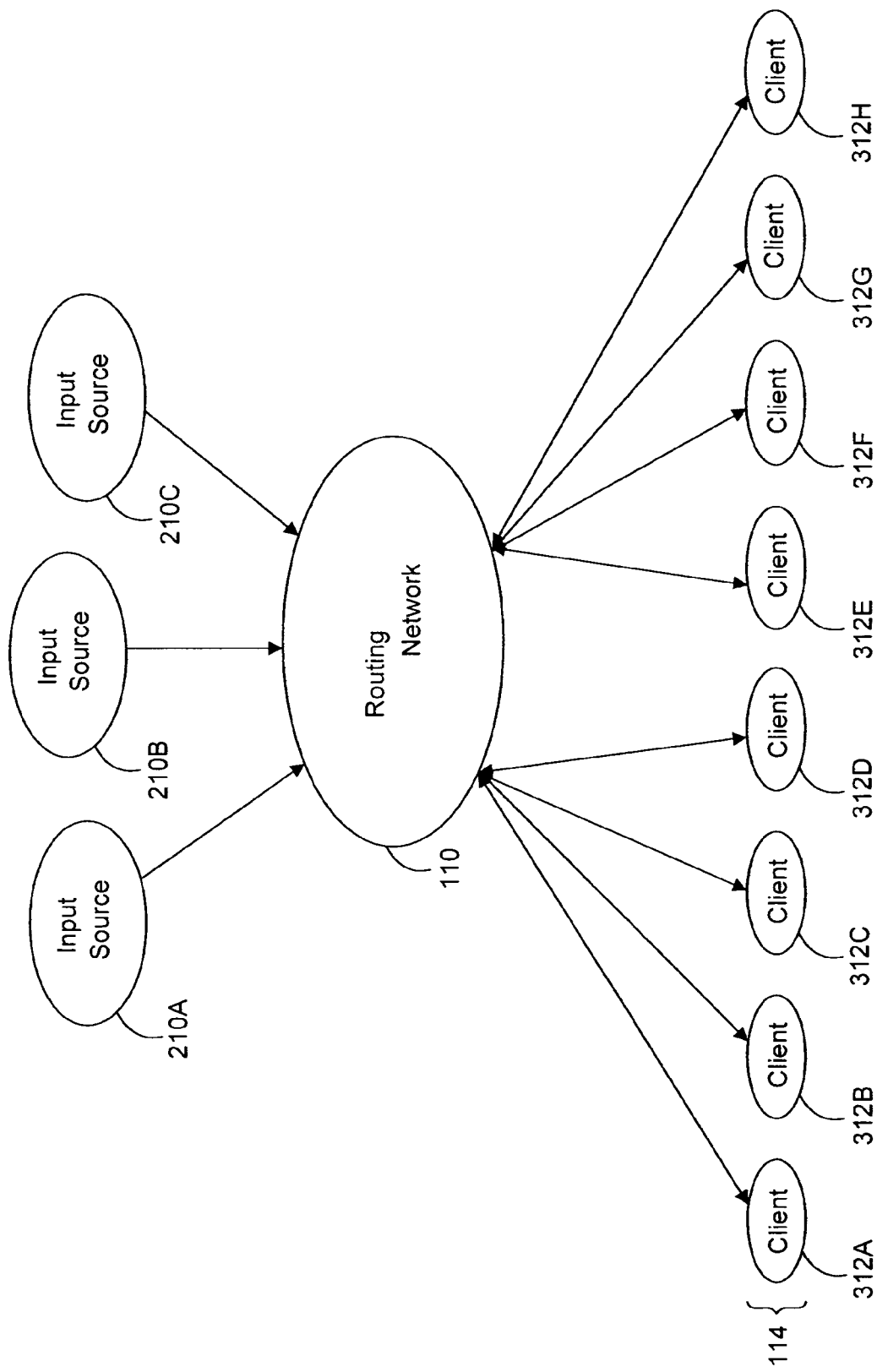
FIG. 3 is a high-level diagram graphically indicating the many-to-many mapping performed by the routing network.

FIG. 3 is a high-level diagram graphically indicating the many-to-many mapping performed by the routing network 110. Multiple input sources (labeled 210A-C) send update messages to the routing network 110. Each update message preferably specifies at least one object ID and an update to a property of the identified object. The routing network 110, in turn, selectively routes the update messages to the clients 114 that have registered for the given object ID from the given input source 210. In FIG. 3, assume for example that clients 312A and 312B have registered for a given object ID while the other clients have not registered for the object ID. Accordingly, the routing network 110 routes the update message to clients 3 12A and 312B, but does not route the message to clients 312C-312H.

FIG. 4 illustrates an example of the capabilities of the dynamic content routing network 110. FIG. 4 illustrates two different web pages 410, 412 containing sports scores. Although the web pages are formatted differently, each page contains the same scores for two professional football games and two professional baseball games. Web page 410 contains all four games under the heading "Local Sports Scores" while web page 412 contains the baseball games under the heading "Baseball Scores" and the football games under the heading "Football Scores."

There are various ways to internally represent the games and scores in the web pages using live objects. In one embodiment, a "game" object is defined having properties for the two teams involved in the game and the score associated with each team. The game object is placed at a selected position in the web page and the properties of the object cause the information about the game to be displayed on the page. In another embodiment, "team" and "score" objects are defined, with the team object having a property defining the name of a team and the score object having a property defining a score. In this second embodiment, the team and score objects are placed at selected locations on the page so that the proper teams and scores are aligned when the page is rendered. In yet another embodiment, an object is defined having properties for the name of one team and a score associated with that team. Then, pairs of the objects are placed in the page in the proper alignment to indicate the games and scores. In another embodiment, an object is defined having properties specifying names of two teams and a separate object is defined having properties specifying two scores. In this last embodiment, the two objects are placed in the page so that the names of the teams align with the associated scores. Obviously, additional variations of these representations are possible.

Assume for the example of FIG. 4 that the names of teams in a game are specified by a "names" object having properties for the two team names and the scores in the game are specified by a "scores" object having properties for two scores. In web page 410, a names object 414 having properties set to identify the "SF 49ers" and the "STL Rams" is located directly under the "Local Sports Scores" heading. A scores object 416 having a property set to identify the score of the game as "42" to "7" is directly to the right of the names object 414. In web page 412, the properties of the second names object 418 identify the same game using slightly different terminology: "SF" and "STL." However, this names object 418 is aligned with the same scores object 416 as is utilized in web page 410.

Thus, the same scores object 416 is utilized in different positions in each web page 410, 412. In order to update the score of the San Francisco 49ers vs. St. Louis Rams football game on both web pages, the input source 210 simply sends an update message to the routing network 110 specifying the object ID for the scores object 416 and the update to the score property. The routing network 110 routes the update message to the appropriate clients 114, and the clients update the appropriate score regardless of the particular page layout.

Figure 5:
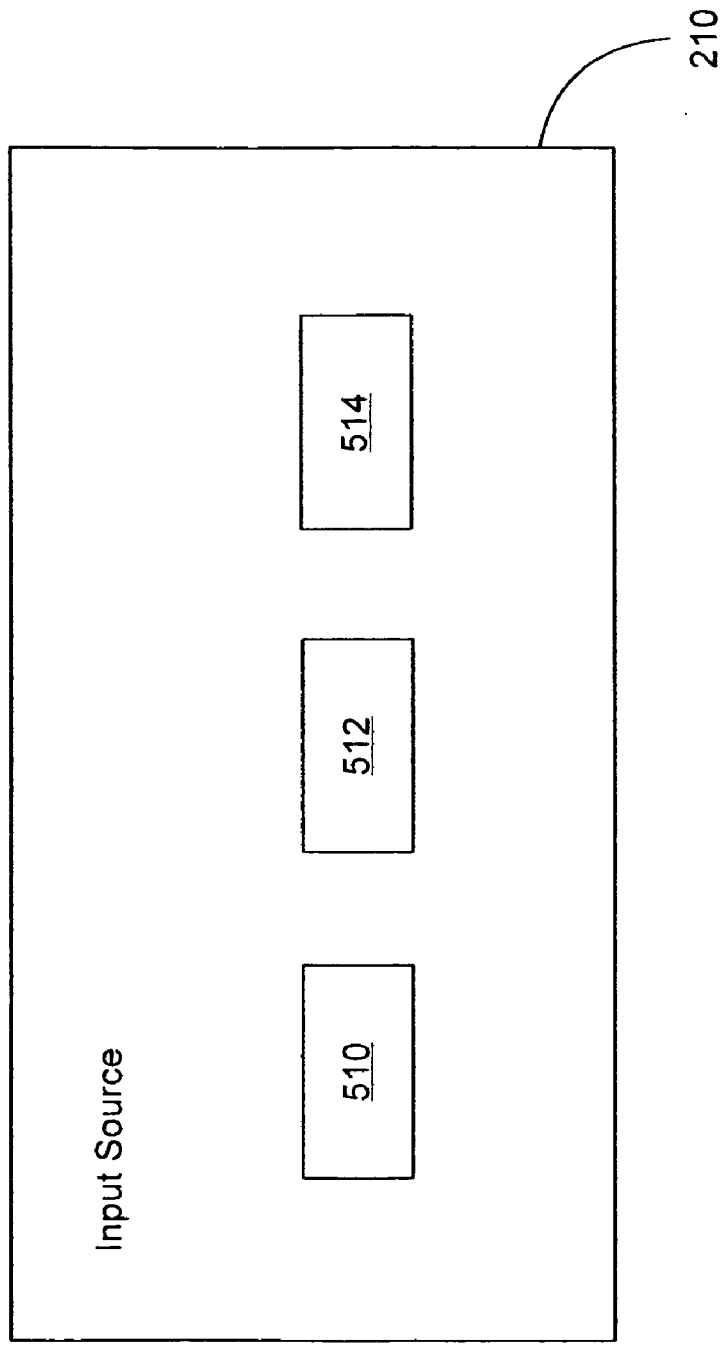
FIG. 5 is a block diagram illustrating an input source and the tools available to it for generating the update messages.

The input source 210, i.e., the information provider 108 and/or dynamic content provider 116 can use a variety of tools to generate the update messages. FIG. 5 is a block diagram illustrating an input source 210 and the tools available to it for generating the update messages. Other tools can be utilized in addition to or instead of the ones described herein.

Preferably, the tools allow the input source 210 to access an application programming interface (API) provided by the routing network 110 for accepting messages. In one embodiment, the messages sent by the input source 210 are in the same format as utilized by the activation module 124 at the client 114. In an alternative embodiment, the messages provided to the routing network 110 are in a different format and the routing network translates the messages into the format utilized by the activation module 124.

In one embodiment, the input source 210 utilizes a data pump module 510 to access the API. The data pump module 510 reads an extensible markup language (XML) file containing one or more object IDs and the new values for the identified objects at regular intervals and automatically generates API calls that send messages representing changes to object properties to the routing network 110. In another embodiment, the data pump module 510 is event-driven and reads the XML file in response to a change in the file or some other occurrence.

In another embodiment, the input source 210 utilizes a director console module 512 to access the API. Preferably, the director console module 512 presents an administrator with a graphical interface displaying the contents of the web page 118. For example, the administrator may use the director console 512 to edit textual data, images, and/or any objects or properties of objects on the web page. After editing, the administrator uses a "send update" button or similar technique to cause the director console module 512 to send messages for the changed objects and properties to the routing network 110 via the API.

In another embodiment, the information provider 108 and dynamic content provider 116 work together as the input source 210 by using a content management system module 514 to access the API. Preferably, the content management system module 514 resides at the information provider 108 and receives object property updates from the dynamic content provider 116. The content management system module 514 preferably updates the properties of the live objects in the web page 118 stored at the server 112 and also sends messages for the changed properties to the routing network 110. In this manner, the web page 118 at the server 112 and the web page displayed at the client 114 are updated almost simultaneously. In one embodiment, the dynamic content provider 116 sends the update messages to the routing network 110 instead of to the information provider 108. Embodiments of the system 100 can also utilize any combination of the content management techniques described herein.

For example, the tools described above can generate a message having the following code for updating the text displayed by a score object to "2":

LiveObject score=new LiveObject("Bang$homeScoreID");
score.setProperty("innerText", "2").

This code sets the innerText property of the object having object ID "Bang$homeScoreID" to "2." The tools use the API to pass this message to the routing network 110.

Figure 6:
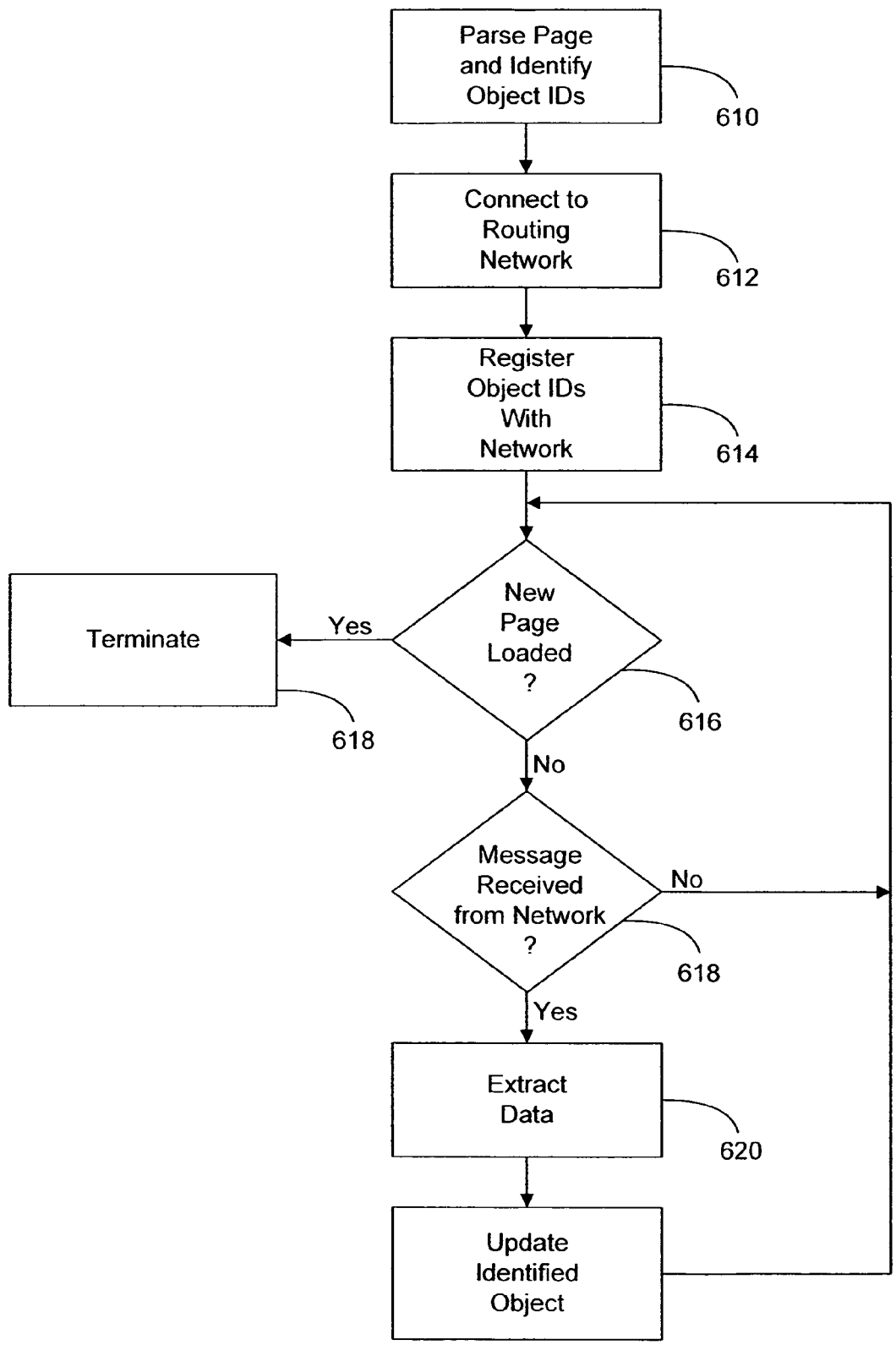
FIG. 6 is a flow chart illustrating the steps performed by an embodiment of an activation module.

Turning now to the actions performed at the client 114, FIG. 6 is a flow chart illustrating the steps performed by an embodiment of the activation module 124. Those of skill in the art will recognize that different embodiments may perform the steps of FIG. 6 in different orders. The activation module 124 generally performs three functions: register object IDs with the routing network 110, handle messages received by the client 114 from the network in order to update the properties of live objects, and control communications between the client and the network.

In order to register object IDs, the activation module 124 preferably parses 610 the web page 118 received from the server 112 and identifies the object IDs of the live objects. In an alternative embodiment, the activation module 124 identifies only a subset of the object IDs, such as the IDs of only live objects that are currently being displayed by the web browser 120. Alternatively, a list of object IDs may be pre-encoded in the web page in addition to the objects themselves, thereby enabling easy identification by the activation module 124. In yet another embodiment, a user of the client 114 selects the object IDs to register.

The activation module 124 preferably opens 612 a connection between the client 114 and the routing network 110. The activation module 124 can open 612 this connection before or after the activation module receives and/or parses the web page 118. In some cases, the client 114 is located behind a firewall that puts a restriction on the types of connection requests the client can make. A firewall might, for example, block all non-HTTP traffic. For this reason, the activation module 124 preferably wraps the connection request in an HTTP header in order to get the request to the routing network 110 through the firewall.

The activation module 124 uses the connection between the client 114 and routing network 110 to register 614 the object IDs by communicating to the routing network 116 a vector (e.g., a list or array) containing the identified object IDs. In order to accomplish this task through the firewall, the activation module 124 preferably puts the vector into a string, referred to as "object data," and then preferably creates an HTTP message to communicate the object data to the routing network 110. A schematic example is as follows:

POST/HTTP/1.\r\n
Content-Length: <length of object data>\r\n
\r\n
<object data> where <object data> is the object ID list. When the routing network 110 receives such an HTTP request, it extracts the object data and updates the registry 125 to indicate that the client 114 has registered for the identified objects.

If the web browser 120 loads 616 a new page, or otherwise terminates display of the objects on the initial page, the activation module 124 associated with the initial web page preferably terminates 618 the client's connection with the routing network 110. Those of skill in the art will recognize that this termination 618 can occur asynchronously with the other steps illustrated in FIG. 6. Thus, the location of steps 616 and 618 represents only one possible place in the sequence of steps where the termination may occur.

If the connection is not terminated, the activation module 124 preferably waits until it receives 618 a message from the routing network 110 specifying an object ID and an update to a property of the identified object. In one embodiment, this message is received as HTTP data. Upon receipt of the message, the activation module 124 preferably extracts 620 the object ID and update from the HTTP data. Then, the activation module 124 updates 622 the property of the identified object, or causes the object to be updated, as specified by the message.

The sequence of receiving messages 618, extracting data 620, and updating objects 622 is preferably repeated until a new page is loaded 616 or the connection with the routing network 110 is otherwise terminated. Although not shown in FIG. 6, in certain circumstances, such as when a user action with respect to the web page 118 activates a new live object, the activation module 124 may register new object IDs with the routing network 110 without first downloading and parsing a new page. In one embodiment, if the newly-loaded page contains live objects, then the process of downloading the activation module 124 and updating the objects as described by FIG. 6 is repeated. In an alternative embodiment, the activation module 124 remains active at the client 114 and, therefore, the client does not re-download the activation module from the routing network 110. Instead, the already-present activation module 124 performs the live-enabling process on the new page.

Figure 7:
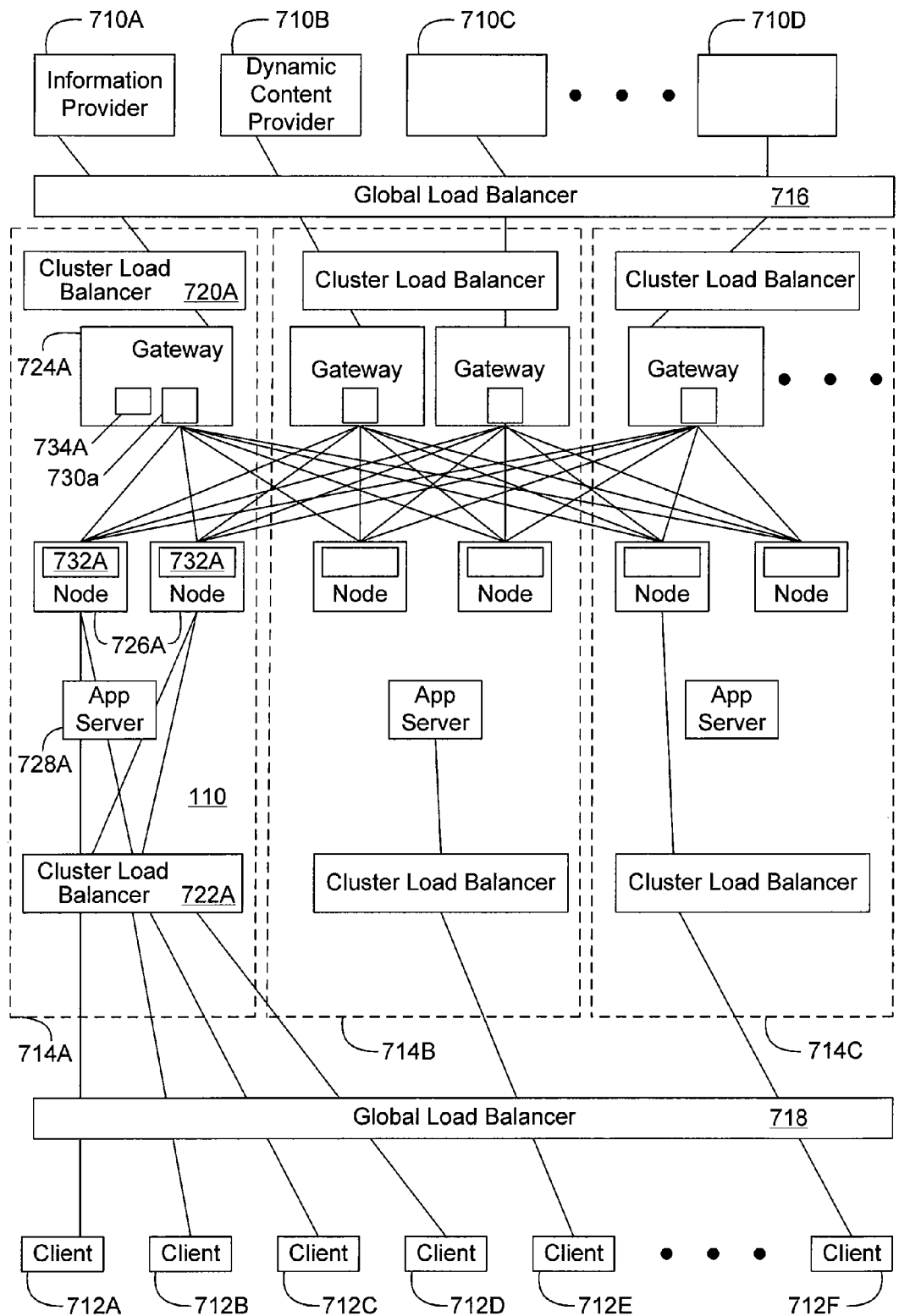
FIG. 7 is a block diagram illustrating a lower-level view of the routing network according to an embodiment of the present invention.

FIG. 7 is a block diagram illustrating a lower-level view of the routing network 110 according to one embodiment of the present invention. FIG. 7 illustrates multiple input sources (labeled 710A-D) representative of sources providing messages to the routing network 110, such as an information provider 710A and a dynamic content provider 710B. FIG. 7 also illustrates multiple clients (labeled 712A-F) representative of the many clients in communication with the routing network 110 at any given instant.

Internally, the routing network 110 is preferably divided into one or more clusters 714. In FIG. 7, the routing network 110 has three clusters 714A, 714B, 714C, although the number of clusters can vary depending upon the processing needs of the network. An input-side global load balancer 716 preferably routes messages from the input sources 710 to the clusters 714. Similarly, a client-side global load balancer 718 preferably routes connection requests from the clients 712 to the clusters 714. The load balancers 716, 718 are designed to ensure that load is distributed among the clusters 714 according to a predetermined heuristic. For example, the load may be distributed evenly among the clusters 714 or a more powerful cluster may be distributed a majority of the load. In one embodiment, one load balancer performs the functions of the input-side 716 and client-side 718 load balancers and utilizes conventional Domain Name System-(DNS-) based load balancing.

Each cluster 714, of which cluster 714A is representative, preferably contains an input-side cluster load balancer 720A and a client-side cluster load balancer 722A. The cluster load balancers 720A, 722A function similarly to the corresponding global load balancers 716, 718 in that the input-side cluster load balancer 720A balances and routes incoming messages among one or more gateways 724A and the client-side cluster load balancer 722A balances and routes incoming connection requests among one or more nodes 726A and application servers 728A. The gateways 724A are connected to the nodes 726A. In one embodiment every gateway 724A is connected to every node 726A and in another embodiment certain gateways are connected to only certain nodes.

Preferably, the routing network 110 utilizes conventional single-processor computer systems executing the Linux operating system (OS). Preferably, each component of the routing network 110 is implemented by a separate, dedicated computer system in order to enable the separate optimization of the components. The input/output (I/O) functionality of the OS is preferably enhanced through the use of a non-blocking OS package such as NBIO available from the University of California, Berkeley, Calif. Based on the assumption that connections with the nodes 728 are long-lived, the OS is preferably configured to not allocate resources toward monitoring idle connections. Instead, the well-known/dev/poll patch is preferably applied to the OS in order to provide advanced socket polling capabilities.

Those skilled in the art will recognize that there are many ways to use the functionality of the routing network 110 to route update messages to clients 710. For example, in one embodiment, every message is distributed to every node 726. In another embodiment, the routing network 110 selectively sends messages to the nodes 726 in the routing network 110. Selectively sending messages to the nodes in the routing network presents at least the two difficulties. First, for a given message, a decision needs to be made as to which nodes should receive it. Second, a client must receive all messages in which it is interested. There are at least two approaches meeting these difficulties. The first approach uses a hierarchy of registries at the gateways and nodes to respectively keep track which messages to send to the nodes and clients. The second approach assigns messages to one or more categories, assigns nodes to one or more types, and maintains mappings between categories and types. This latter approach also uses client proxies to allow clients 712 to communicate with multiple nodes of different types.

FIG. 7 illustrates the embodiment using the hierarchy of registries. A node 726 registers with each gateway 724 in all of the clusters and indicates which messages it needs and the clients do the same with the nodes. Each gateway 724 preferably maintains a registry 734 containing the object IDs registered by the nodes 726 connected to the gateway 724. In one embodiment, the gateway registry 734 associates each object ID with a linked list containing one entry for each node 726 that has registered for that object ID. In another embodiment, the gateway registry 734 is a hash table containing the object ID registered by the nodes 726 connected to the gateway 724. A node 726 preferably maintains a node registry 732 containing the object IDs registered by clients 712 connected to the node. The gateways 724 in each cluster 714 receive the messages from the input sources 710 and direct the messages to the appropriate node or nodes 726. The nodes 726 preferably transmit messages received from the gateways 724 to the clients 712 that have registered in the object IDs identified by the messages.

In one embodiment, the node registry 732 associates each object ID with a linked list containing one entry for each client 712 that has registered for that object ID. In another embodiment, the node registry 732 is a hash table containing the object ID registered by the clients 712 connected to the nodes 726. Each entry in the linked list or hash table preferably contains a pointer to a socket representing the connection to the corresponding client 712. As is known in the art, the pointer to the socket, typically called a "file descriptor," represents an address to which the node can write in order to send the message to the corresponding client. Gateways 724 can also use file descriptors in this manner to store node addresses. Alternative embodiments of the present invention utilize other data structures in addition to, or instead of, the hash table and linked list, and/or may utilize different data within the data structures.

Preferably, the node 726 adds an entry to its registry 732 every time a client 712 registers an interest in an object and deletes the corresponding entry from the registry when the client 712 disconnects from the node or otherwise indicates that it is no longer interested in a particular object. If the node 726 determines that the client 712 registered for an object ID that was not previously registered on that node, the node preferably registers that object ID with the gateways 724 to which it is connected. Similarly, if the node 726 determines that the client 712 deregistered an object ID for which it was the last interested client, the node 726 deregisters that object ID with the gateways 724 to which it is connected. The gateways 724 update their registries 734 in response to the communication from the node 726.

In alternative embodiments of the present invention, when the client 712 disconnects from the node 726 or otherwise indicates that it is no longer interested in a particular object, the node 726 waits for a period of time or until some event occurs before deregistering the object ID with the gateway 724. For example, the node 726 could wait until it receives a message associated with that object ID to do the deregistration. Alternatively, the wait time can be fixed, random, or based on the frequency of registrations for that object ID, or registrations for the same input source 710 as the object being deregistered. This latter approach keeps the object IDs from more frequently used input sources 710 registered for a longer period of time. This waiting advantageously reduces the number of registration changes required between nodes and gateways in cases where it is likely that another client will soon register for the same object ID.

Since a gateway 724 does not control the rate at which it receives messages from input sources 710, it is possible for the gateway to receive messages faster than it can process them (i.e., send the messages to the nodes). Therefore, each gateway 724 preferably maintains a queue 730 of messages that have been received but not yet processed in order to avoid losing messages. In one embodiment, the gateway 724 drops messages if the queue 730 becomes too long. In another embodiment, the gateway 724 utilizes priorities assigned to certain messages or input sources to determine which messages to drop.

The application server 728 within each node 714 preferably serves the activation module 124 to the clients 712 in response to client requests. In addition, the application server 728 serves any other modules that may be required or desired to support the environment 100. In an alternative embodiment of the routing network, a single application server 728 fulfills all of the client requests. This application server 728 may be within a certain cluster 714 or independent of the clusters. However, this single-application-server embodiment is less desirable because it lacks redundancy.

Figure 8:
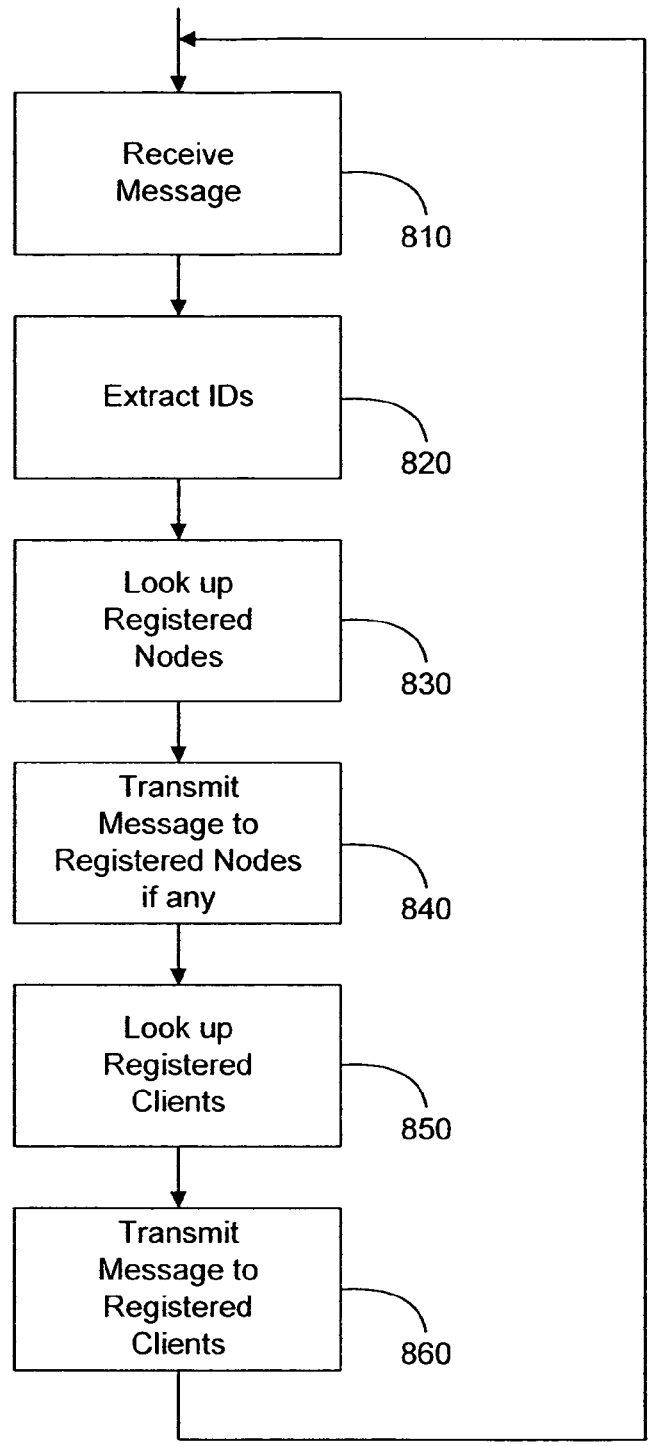
FIG. 8 is a flow chart illustrating steps performed by a gateway and a node in a cluster to perform object-based routing of a message received from an input source in an embodiment using a hierarchy of registries.

FIG. 8 is a flow chart illustrating steps performed by a gateway 724 and a node 726 in a cluster 714 to perform object-based routing of a message received from an input source 710 in the embodiment using a hierarchy of registries. Initially, the gateway 724 receives 810 the message from the input source 710. The gateway 724 extracts 820 the object ID from the message. The gateway 724 examines its registry 734 to determine the nodes 726 that have registered in the object ID. The gateway 724 transmits 840 the message to each of the registered nodes 726. Each node 726 that receives the message uses its registry 732 to determine 850 which clients 712 have registered for the message. Each node 726 then forwards 860 the message to the registered clients 712.

Adding node functionality to the gateway and client functionality to the node advantageously allows the routing network 110 to solve the difficulties identified above. For example, it allows the routing network 110 to decide which nodes should receive an updated message. As a result, messages are sent to only nodes that have registered for the message. Further, no matter which node a client connects to, that node will receive all messages that the client wants. One skilled in the art would understand that while the present invention allows registration at both a gateway level and node level, registration could be extended to any number of levels.

In the second approach for meeting the difficulties described above, all messages in the routing network 110 are assigned to one or more of N categories, and all of the nodes are assigned to one or more of M types. Mappings are created that specify which categories of messages are forwarded to which types of nodes. The mappings allow control over the amount of traffic processed by the nodes.

Figure 9:
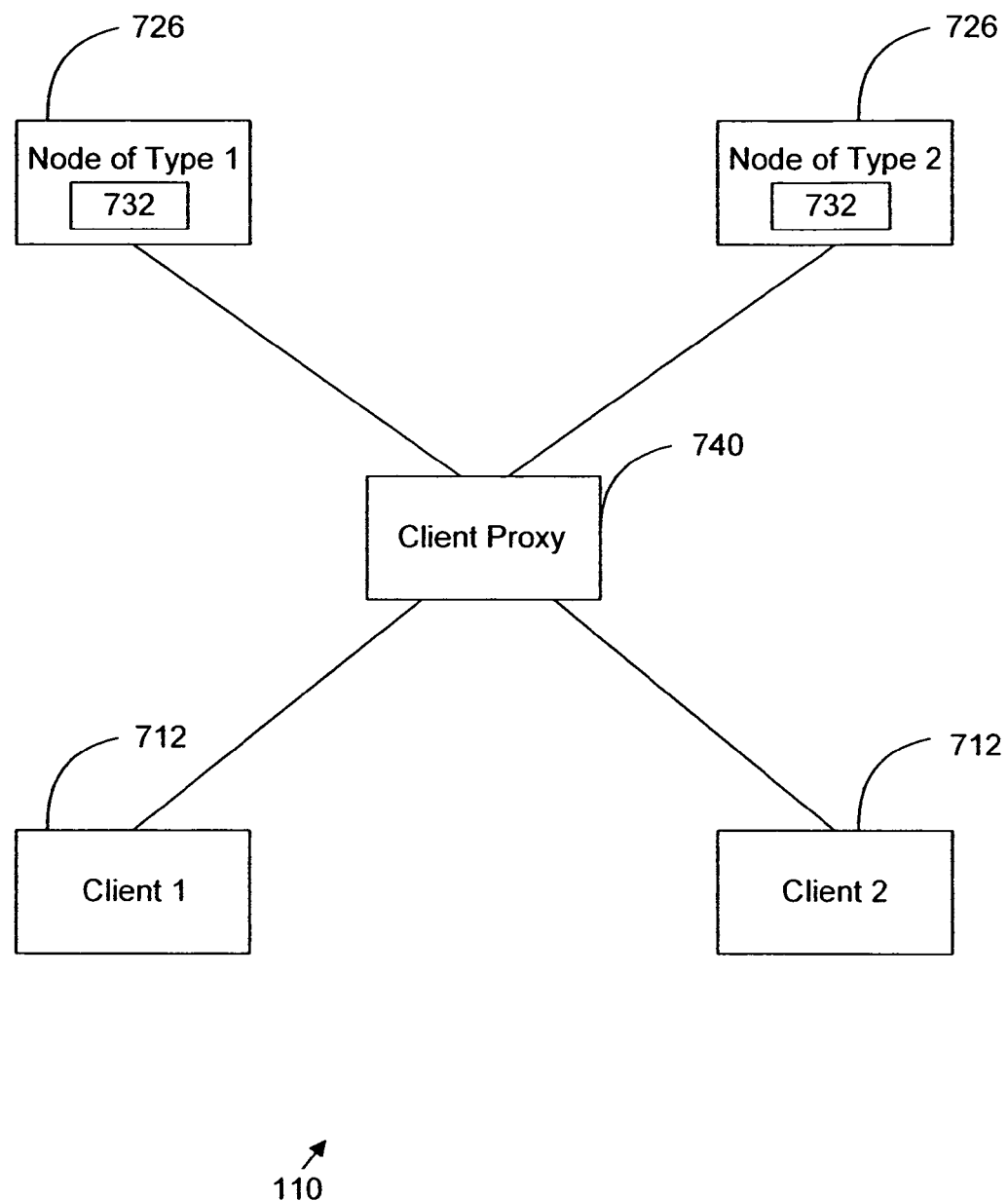
FIG. 9 is a block diagram illustrating a high-level view of the routing network in an embodiment adapted to use message categories, node types, and client proxies.

FIG. 9 is a block diagram illustrating a high-level view of the routing network 110 of FIG. 7 in an embodiment adapted to use the approach having message categories and node types. Although FIG. 9 illustrates only two node types—nodes of type 1 726 and nodes of type 2 726—for purposes of simplicity, this embodiment of the network 110 can have any number of node types. FIG. 9 also illustrates a client proxy 740 for reasons described below. However, an embodiment of the present invention using message categories and node types does not necessarily utilize a client proxy 740.

There are many different possible mappings between message categories and node types. In the simple case, there is one-to-one mapping between message categories and node types. For example, if the message is of category 1, it is forwarded to the nodes of type 1. In more complicated mappings, messages of one category are mapped to nodes of multiple types. For example, messages of category 1 are mapped to nodes of types 1, 2, and 3, whereas messages of category 2 are mapped to nodes of types 2, 3 and 4. In short, any possible mapping of message categories to node types is possible and the number of message categories, N, does not have to be the same as the number of node types, M.

There are multiple ways to assign the messages into categories. One way is to assign all messages from a given input source 710 into a certain category. Another way is to explicitly specify the category in the object ID for the message. Yet another way is to utilize a hashing function or lookup table to partition messages into categories based on object IDs or other values. For example, in one embodiment a hash function is applied to the object ID to generate an integer between 1 and N, and this integer is the message category.

Nodes are preferably assigned to types based on information stored in the gateways 724. In one embodiment, each gateway 724 holds a lookup table or other data structure that specifies the types to which each node is assigned. The lookup table also preferably stores the mappings between message categories and node types. When a gateway 724 receives a message from an input source, the gateway preferably determines the category of the message using one of the techniques described above. Then, the gateway 724 determines the node type (or types) to which the message category maps, and determines which nodes are of the given type. The gateway 724 routes the message to the appropriate nodes.

In one embodiment, the gateway 724 uses a combination of multiple techniques to determine the message categories, node types, and/or mappings. For example, a lookup table can be used to encode a priori knowledge about categories, types, and/or mappings and a hash table can be used to route messages for which there is no a priori knowledge. Continuing this example, assume that certain messages are assigned to a given category based on a table lookup, while other messages are assigned to categories based on a hashing function. In this example, the gateway 724 looks up the object ID (or other information, such as an input source ID) of an arriving message in a lookup table to determine if it has a specified category. If the object ID is stored in the lookup table, the gateway 724 determines the mappings for the category and routes the messages to the nodes of the appropriate types. If the object ID is not stored in the lookup table, the gateway 724 utilizes a hash function on the object ID (or other information) to determine the message category.

Message categorization advantageously allows the routing network 110 to decide which nodes get which messages. However, message categorization does not ensure that clients 712 have access to the messages they need. Assume a client 712 connects to a node of type 1 and the client 712 wants to receive messages of category 3. If there is a simple one-to-one mapping of message categories to node types, nodes of type 1 will never receive messages of category 3, and neither will the client 712. To ensure that clients have access to the messages they need, the embodiment shown in FIG. 9 uses client proxies to allow clients 712 to communicate with multiple nodes of different types. As shown in FIG. 9, the clients 712 connect to a client proxy 740 instead of the nodes 726. Each client proxy 740 is connected to at least one node of each type. For example, as shown in FIG. 9, the client proxy 740 connects to a node of type 1 726 and a node of type 2 726.

There are at least two ways to implement the embodiment that uses client proxies to ensure that clients connect to multiple nodes of different types. The implementations vary primarily in where the client registration information is stored. In the first variation, client registration information is stored at the nodes, and the client proxy is adapted to simply pass update messages and registration information among the clients and nodes. In the second variation, the client proxy 740 is responsible for keeping track of client registrations.

FIG. 9 illustrates the variation where the nodes store the client registration information, and the client proxy 740 is adapted to pass messages and registration information among the clients and nodes. When a client sends registration information to the client proxy 740, the client proxy passes it to the appropriate node or nodes. In one embodiment, the client proxy 740 sends client registration information to at least one node of every type, and the nodes ignore irrelevant registration information (e.g., registrations for messages of categories not handled by the node). In another embodiment, the client proxy 740 itself analyzes the registrations, and passes only registrations relevant for a given node type to a node of that type. In a third embodiment, the client contains functionality for determining which node types handle which registration requests, and the client tells the proxy 740 to which node types to pass the registration information.

The client proxy 740 preferably stores an identifier of its connection to each client 712, such as a pointer to the socket for the client connection, and sends this identifier to the nodes along with the registration information. Each node 726, in turn, maintains a registry 732 storing the relevant registration information it receives from the client proxy 740. Preferably, at most one node of each type will contain registration information for a given client for messages of a category mapped to the node type. In addition, a node preferably does not store registration information for messages of categories not mapped to its node type.

The registry 732 for each node 726 preferably indicates the object IDs registered by the clients, the client proxy 740 to which the client is connected (e.g., a pointer to the socket at the node to which the client proxy is connected), and the identifier indicating the client's connection to the client proxy (e.g., the pointer to the socket at the client proxy to which the client is connected). When the node 726 receives an update message, it uses the registry to identify the clients to which it should forward the message, the client proxies to which the clients are connected, and the specific connections between the client proxies and the clients. The node routes the update message to the identified client proxies and includes the identifier (e.g., the pointer to the client socket) telling the client proxy where to send the update message. When the client proxy 740 receives the update message, it uses the identifier to send the message to the client or clients.

In one embodiment, the node registry 732 contains, for each object ID, a list with one entry for each client registered for that ID. Each entry contains a (name of client proxy, name of client) pair where each "name" is a socket identifier or some other information for identifying how to route the message to the named entity. In another embodiment, the registry 732 is adapted to more efficiently handle the case where multiple clients at a given client proxy are registered for the same object ID by placing a list of clients registered for the object ID in each entry. Thus, each entry in the list for a given object ID contains a (name of client proxy, list of names of clients on that proxy) pair. When a message having a particular object ID arrives at the node, the node walks down the corresponding entries in the registry for that ID, pushing one copy of the message to each listed client proxy. Along with the message, the node includes the list of clients on that proxy (e.g., a list of pointers to sockets for the clients) who have registered for the object ID. When the client proxy receives the message and the list, it simply pushes a copy of the message to each client.

The approach using the pass-through client proxy 740 described above is advantageous because it reduces memory loads because the client proxy stores only minimal state, and each node has a restricted list of object IDs for which it is responsible. It also expedites message routing because the client proxy does very little processing to forward a message. Plus, this approach separates different potential stress points in the network into different components, allowing the network to be tuned to provide good performance. In particular, the nodes handle a large amount of data and store a large amount of state, but do not have to hold open a large number of connections. The client proxies do not store a large amount of data or state, but hold open a large number of connections to the clients. In different embodiments, the ratios of nodes to client proxies can be varied to match the network to its requirements.

Figure 11:
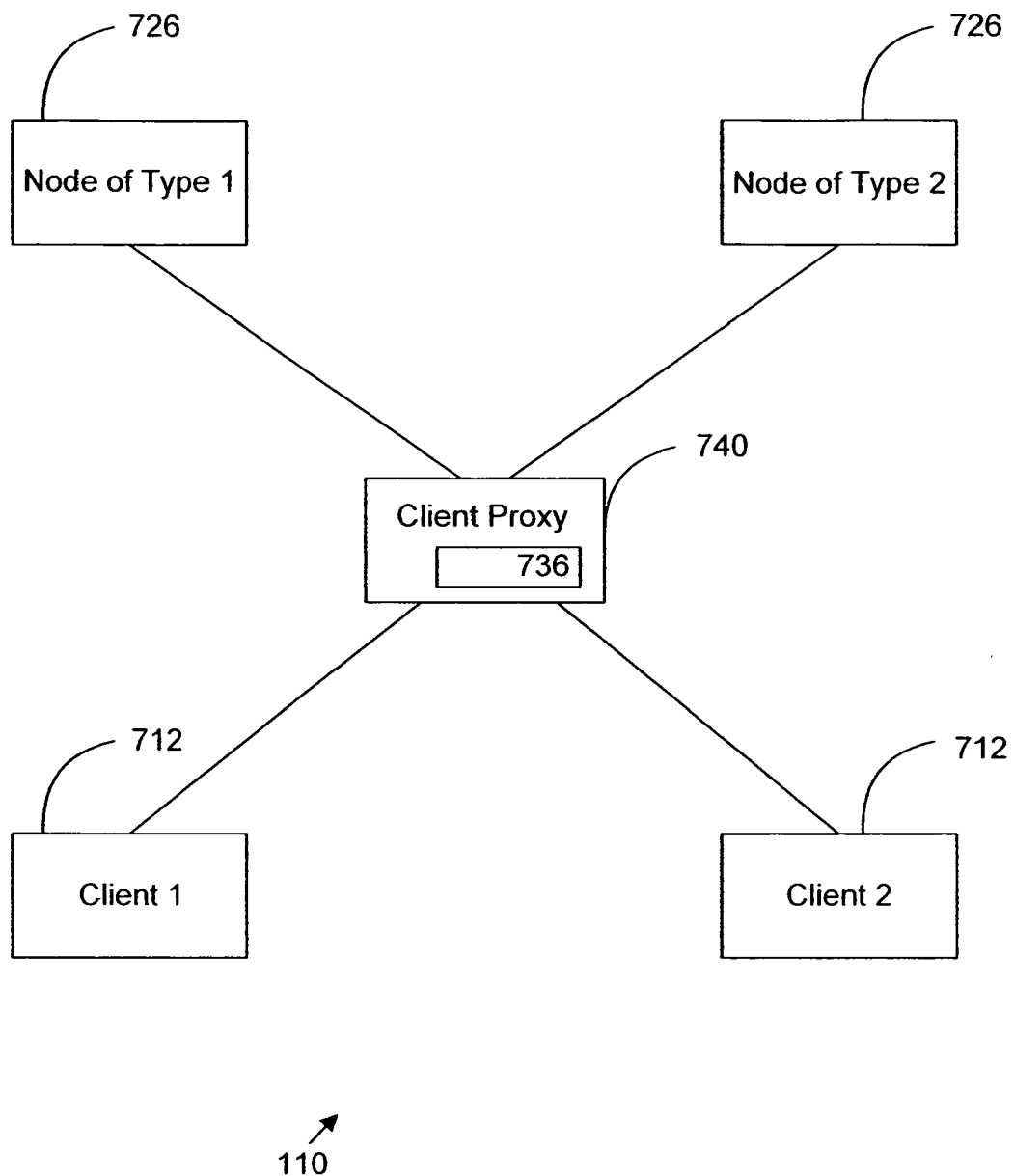
FIG. 11 is a block diagram illustrating a high-level view of the routing network for an embodiment in which the client proxy stores the client registration information.

In the second variation of client proxies, the client proxy 740 stores client registration information. FIG. 11 illustrates a high-level diagram of the routing network 110 in which the client proxy 740 stores the client registration information. In this embodiment, the node registry 732 stores the object IDs registered by client proxies 740 connected to the node. Each client proxy 740 preferably maintains a client proxy registry 736 containing the object IDs registered by clients 712 connected to the client proxy 740. The client proxy 740 registers with the nodes for all objects for which it needs to receive updates. Thus, this variation is similar to the hierarchical registry embodiment described above.

An alternative to maintaining a separate client proxy as described above is to have the nodes themselves provide the client proxy functionality. In this alternative, clients connect to a node of a first type. When a client registers for messages of a category not handled by the node, the node passes the registration to a node of the appropriate type along with an identifier of the client connection. In this case, the node connected to the client adopts the functionality of the pass-through client proxy. The node can also adopt the functionality of the client proxy that stores client registration information, thereby creating a hierarchy of registrations among the nodes themselves.

Figure 12:
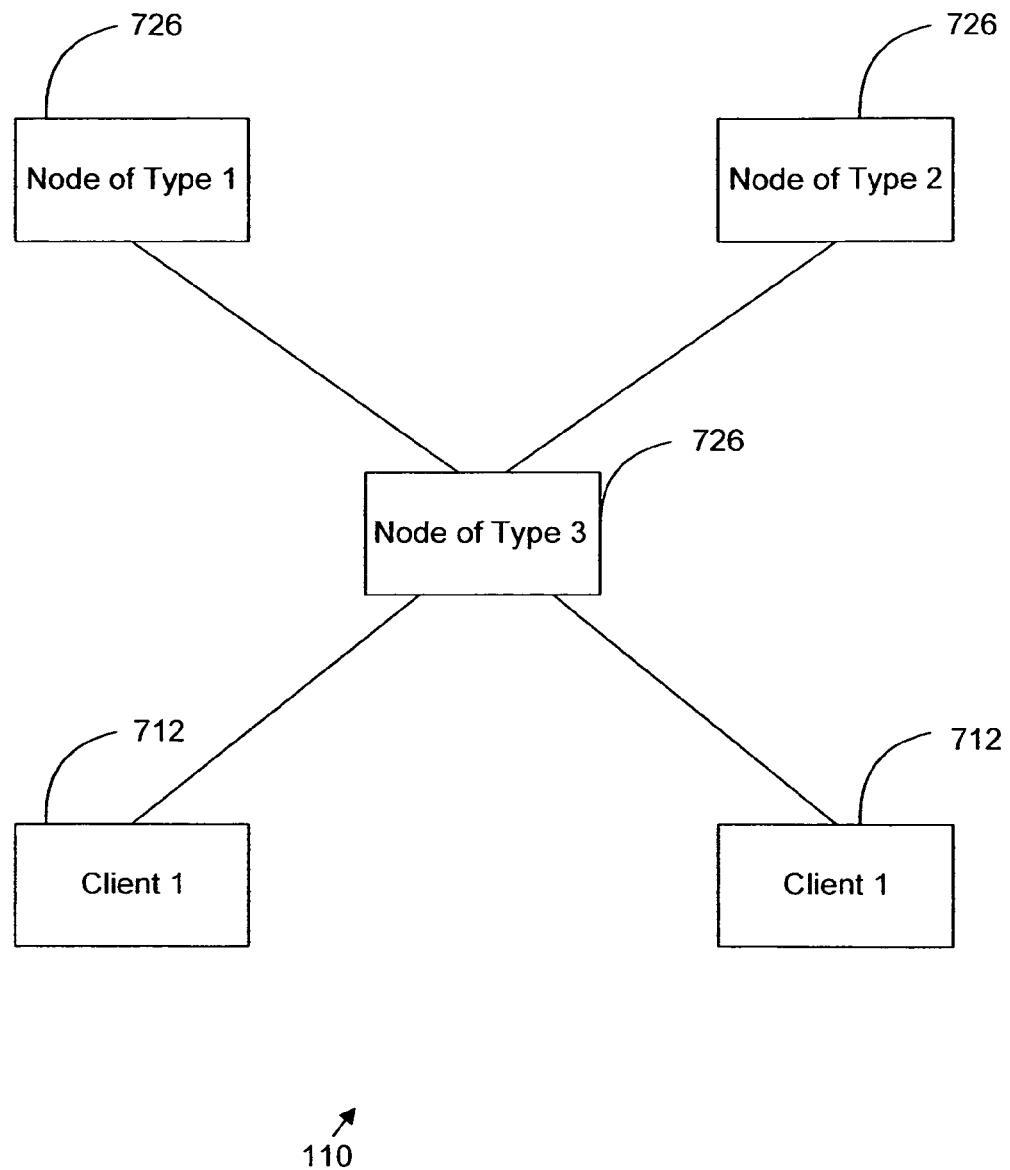
FIG. 12 is a block diagram illustrating a high-level view of the routing network for an embodiment in which the nodes adopt client proxy functionality.

FIG. 12 is a high-level block diagram of the routing network 110 of the embodiment in which the nodes themselves adopt client proxy functionality. There are at least two ways to implement this embodiment. In one implementation there is a preferred node type, such as node of type 3, that always serves as a client proxy. This node type may be designated to handle the most common categories of messages. As a result, the client proxy functionality would be utilized very rarely. As shown in FIG. 12, client 1 712 and client 2 712 are connected to the node of type 3 726, which in turn is connected to a node of type 1 726 and a node of type 2 726.

In another implementation, instead of having one preferred node type that always serves as a client proxy, each node type can serve as a node and as a client proxy. For example, when a client 712 connects to a node 726, it passes the node all of the object IDs the client wishes to register. For object IDs of message categories handled by that node, the node stores the registrations in its registry. For object IDs of messages in other categories, the node acts as a client proxy and passes the registration requests to nodes of the appropriate types. This implementation can be made more efficient by providing functionality in the activation module for identifying the most common categories of messages sought by the client, and causing the client to connect to a node of a type that receives those categories of messages.

An alternative to connecting clients 712 to nodes 726 using a client proxy 740 is having a client 712 maintain multiple connections to the routing network 110. This can be accomplished, for example, by attaching message-categorization functionality to the activation module 124. The activation module 124 preferably determines which categories of messages it needs and to which nodes types it should connect. The activation module 124 then makes a connection to one node of each relevant type and registers the appropriate object IDs with the appropriate nodes.

An alternative to using client proxies is to allow clients to register for only categories of messages handled by one type of node. For example, if each node type handles messages from only one input source, each client 712 can be required to register for messages from only one input source. This can be done, for example, by configuring the load balancer 718 to ensure that clients registering for messages from one input source connect to a node of the type that receives messages from that input source.

Figure 10:
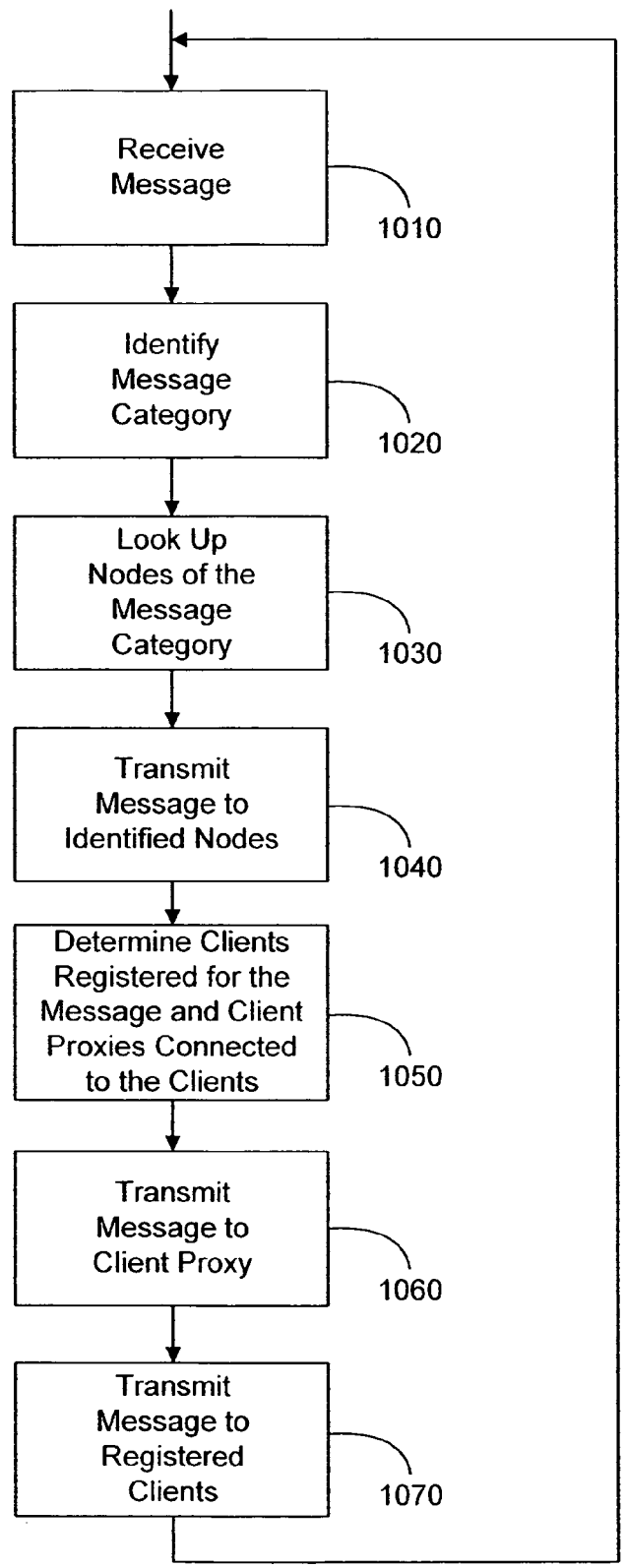
FIG. 10 is a flow chart illustrating steps performed by a gateway, a node that stores client registration information, and a pass-through client proxy to perform object-based routing of a message received from an input source.

FIG. 10 is a flow chart illustrating steps performed by a gateway 724, a node 726 that stores client registration information, and a pass-through client proxy 740 to perform object-based routing of a message received from an input source 710. Initially, the gateway 724 receives 1010 the message from an input source 710. The gateway 724 determines 1020 to which category the message belongs using one or more of the techniques described above. After the gateway 724 has determined to which category the message belongs, the gateway 724 identifies 1030 node types to which the message category is mapped and routes 1040 the message to the nodes of those types. Each node 726 that receives the message extracts 1050 the object ID from the message. Each node 726 examines its registry 732 to determine which clients have registered for the message, the client proxies to which the clients are connected, and the connections between the client proxies and the clients. Each node 726 then forwards 1060 the message to the identified client proxies 740 along with the identifiers for the client connections (e.g., the client socket or a list of client sockets). When a client proxy 740 receives the message from a node 726, it pushes 1070 the message to the identified client socket or sockets.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention. For example, the invention may be implemented using a tangible computer-readable medium having stored thereon computer-executable instructions.

The invention claimed is:

1. A method comprising:
    receiving, using a processing device, an update message from an input source, the update message identifying a live object and containing data for updating a property of the live object;
    identifying a category of the update message based on the input source;
    determining a node having a node type to which the update message is to be routed based on a mapping of categories of update messages to node types, the mapping controlling an amount of update message traffic through nodes of a routing network;
    routing, using the processing device, the update message to the node having the determined node type;
    causing the node, through the update message, to determine a client, different from the input source, that has registered for updates of the live object;
        causing the node to route the update message from the node to the client; and
        causing the client to process the update message and to update the property of the lire object.

2. The method of claim 1, further comprising:
    causing the node to extract an object identifier (ID) from the update message, to establish a connection with the client, and to determine if the client has registered for updates of the live object based on the object ID.

3. The method of claim 2, further comprising:
    causing the node to determine at least one client proxy with which the client communicates;
    causing the node to route the update message to the client proxy; and
    causing the client proxy to route the update message to the client to determine the connection.

4. The method of claim 3, further comprising causing the node to maintain client registration information concerning the client connection.

5. The method of claim 3, further comprising causing the node to maintain client registration information concerning the client connection at the client proxy.

6. The method of claim 1, wherein the property of the live object has a direct effect on a visual representation of the live object in a data representation, has an effect on an internal aspect of the live object and has no effect on the visual representation of the live object in the data representation, or has a direct effect on one aspect of the visual representation of the live object in the data representation and has no effect on other aspect of the visual representation of the live object in the data representation.

7. A routing network comprising:
a gateway device configured to:
receive an update message from an input source, the update message identifying a live object and containing data for updating a property of the live object,
identify a category of the update message based on the input source;
determine a node having a node type to which the update message is to be routed based on a mapping of a categories of update messages to node types, the mapping controlling an amount of update message traffic through nodes of a routing network; and route the update message; and
the node configured to:
receive the update message from the gateway device, wherein the node is configured to be mapped to the node type,
determine a client, different from the input source, that has registered for updates of the live object, and
route the update message from the node to the client, wherein the client is adapted to process the update message and to update the property of the live object.

8. The routing network of claim 7, wherein the node is configured to extract an object identifier (ID) from the update message and to determine a connection to the client to route the data to the client.

9. The routing network of claim 8, wherein the node is configured to determine the connection by determining at least one client proxy with which the client communicates and to route the update message to the client proxy.

10. The routing network of claim 9, wherein client registration information concerning the client connection is configured to be maintained at the node.

11. The routing network of claim 9, wherein client registration information concerning the client connection is configured to be maintained at the client proxy.

12. The routing network of claim 7, wherein:
the gateway device is configured to route the update message to the node adapted to receive messages of more than one message category, and
the node is configured to determine a connection with at least one client proxy with which the client communicates and to route the data to the client proxy.

13. The routing network of claim 7, wherein the node type is configured to identify the node that receives the update message from the gateway device.

14. A method comprising:
providing, using a processing device of an input source, a data representation to a client device, different from the input source, coupled to a routing network, wherein the data representation includes at least one live object recognizable by the client device, and causing the client device to respond to the live object of the data representation by determining an object identifier (ID) of the live object and to register for updates of the live object with the routing network, such that registering the client device with the routing network provides client connection information to a node in the routing network; and
sending, using the processing device of the input source, an update message to the routing network, wherein the update message identifies the live object and contains update data that updates a property of the live object,
wherein a gateway device at the routing network is configured to identify a category of the update message based on the input source, to determine a node type to which the identified category maps, and to route the update message to the node, having the node type, at the routing network,
wherein the node is configured to identify the client device as a registered device and to route the update message to the client device, and
wherein the client device processes the update message upon receipt to update the property of the live object at the client device.

15. The method of claim 14, wherein providing the data representation to the client device includes providing the live object that causes the client device to register with a client proxy of the routing network.

16. The method of claim 14, wherein providing the data representation to the client device includes providing the live object that causes the client device to register with the node of the routing network.

17. The method of claim 14, wherein providing the data representation to the client device includes providing an activation module that is executed by the client device and that registers the live object with the routing network.

18. The method of claim 17, wherein providing the activation module includes providing the activation module that is configured to determine a node type that handles registration and that causes the client device to register with the node corresponding to the node type.

19. The method of claim 17, wherein providing the activation module includes providing the activation module that is configured to determine a message category of the data representation and that causes the client device to register with a node having a node type corresponding to the message category.

20. An apparatus comprising:
an input source device configured to provide a data representation to a client device, different from the input source, coupled to a routing network, wherein the data representation includes at least one live object that is recognizable by the client device, and that causes the client device to determine an object identifier (ID) of the live object to register for updates of the bye object with the routing network, such that registering the client device with the routing network provides client connection information to the routing network,
wherein the input source device is configured to route an update message to the routing network, wherein the update message identifies the live object and contains update data for updating a property of the live object,
wherein a gateway device at the network is configured to identify a category of the update message based on the input source, to determine a node type to which the identified category maps, and to route the update message to a node of the node type at the routing network,
wherein the node is configured to identify the client device as a registered device and route the update message containing the update data to the client device, and
wherein the client device is configured to process the update message upon receipt to update the property of the bye object at the client device.

21. The apparatus of claim 20, wherein the live object of the data representation is configured to cause the client device to register with a client proxy of the routing network.

22. The apparatus of claim 20, wherein the live object of the data representation is configured to cause the client device to register with the node of the routing network.

23. The apparatus of claim 20, wherein the received data representation includes an activation module that is configured to be executed by the client device and adapted to register the live object with the routing network.

24. The apparatus of claim 23, wherein the activation module is configured to determine a node type for handling registration and to cause the client device to register with the node of the node type.

25. The apparatus of claim 23, wherein the activation module determines a message category of the data representation and causes the client device to register with the node having a node type corresponding to the message category.

26. An article of manufacture including a computer-readable storage medium having instructions stored thereon, execution of which by a computing device causes the computing device to perform operations comprising:
  providing, using a processing device of an input source, a data representation to a client device, different from the input source, coupled to a routing network, wherein the data representation includes at least one live object that is recognizable by the client device, and that causes the client device to respond to the live object by determining an object identifier (ID) of the live object to register for updates of the live object with the routing network, such that registering the client device with the routing network provides client connection information to the routing network; and
  sending, using the processing device of the input source, an update message to the routing network, wherein the update message identifies the live object and contains update data for updating a property of the live object,
  wherein a gateway device at the routing network is configured to identify a category of the update message based on the input source, to determine a node type to which the identified category maps, and to route the update message to a node of the node type at the routing network,
  wherein the node is configured to identify the client device as a registered device and to route the update message to the client device, and
  wherein the client device is configured to process the update message upon receipt to update the property of the live object at the client device.

27. The article of manufacture of claim 26, wherein the live object of the data representation causes the client device to register with a client proxy of the routing network.

28. The article of manufacture of claim 26, wherein the live object of the data representation causes the client device to register with the node of the routing network.

29. The article of manufacture of claim 26, wherein the received data representation includes an activation module executed by the client device and adapted to register the live object with the routing network.

30. The article of manufacture of claim 29, wherein the activation module determines a node type that handles registration and causes the client device to register with the node of the node type.

31. The article of manufacture of claim 29, wherein the activation module determines a message category of the data representation and causes the client device to register with the node having a node type corresponding to the message category.

32. A non-transitory computer readable storage medium having instructions stored thereon, the instructions comprising:
  instructions for providing a data representation to a client device coupled to a routing network, wherein the data representation includes at least one live object recognizable by the client device, and wherein the client device is configured to respond to the live object of the data representation by determining an object identifier (ID) of the live object to register for updates of the live object with the routing network, such that registering the client device with the routing, network provides client connection information to the routing network; and
  instructions for providing, using a processing device of an input source, different from the client device, an update message to the routing network, wherein the update message identifies the live object and contains update data for updating a property of the live object,
  wherein a gateway device at the routing network is configured to identify a category of the update message based on the input source, to determine a node type to which the identified category maps, and to route the update message to a node of the node type at the routing network,
  wherein the node is configured to identify the client device as a registered device and to route the update message containing the update data to the client device, and
  wherein the client device is configured to process the update message upon receipt to update the property of the live object at the client device.

33. The non-transitory computer readable storage medium of claim 32, wherein the live object of the data representation causes the client device to register with a client proxy of the routing network.

34. The non-transitory computer readable storage medium of claim 32, wherein the live object of the data representation causes the client device to register with the node of the routing network.

35. The non-transitory computer readable storage medium of claim 32, wherein the data representation includes an activation module that is executed by the client device and that is adapted to register the live object with the routing network.

36. The non-transitory computer readable storage medium of claim 35, wherein the activation module determines a node type for handling registration and causes the client device to register with the node of the node type.

37. The non-transitory computer readable storage medium of claim 35, wherein the activation module determines a message category of the data representation and causes the client device to register with the node having the node type corresponding to the message category.

* * * * *

UNITED STATES PATENT AND TRADEMARK OFFICE
CERTIFICATE OF CORRECTION

PATENT NO. : 8,407,722 B2
APPLICATION NO. : 11/396251
DATED : March 26, 2013
INVENTOR(S) : Tuttle et al.

Page 1 of 1

It is certified that error appears in the above-identified patent and that said Letters Patent is hereby corrected as shown below:

On Title Page 2, Item (56), under "OTHER PUBLICATIONS", in Column 2, Line 3, delete "Retrived" and insert -- Retrieved --, therefor.

On Title Page 3, Item (56), under "OTHER PUBLICATIONS", in Column 1, Line 12, delete "Slavak Republic," and insert -- Slovak Republic, --, therefor.

On Title Page 3, Item (56), under "OTHER PUBLICATIONS", in Column 1, Line 48, delete "library/default.asp?url=/library/en-us/dndotnet/hmtl/progthrepool." and insert -- library/default.asp?url=/library/en-us/dndotnet/html/progthrepool. --, therefor.

In the Specifications

In Column 3, Line 24, delete "live: objects" and insert -- live objects --, therefor.

In Column 12, Line 7, delete "provider 210" and insert -- provider 108 --, therefor.

In Column 14, Line 57, delete "network 116" and insert -- network 110--, therefor.

In the Claims

In Column 22, Line 47, in Claim 1, delete "of the lire" and insert -- of the live --, therefor.

In Column 24, Line 45, in Claim 20, delete "of the bye" and insert -- of the live --, therefor.

In Column 24, Line 64, in Claim 20, delete "bye object" and insert -- live object --, therefor.

In Column 26, Line 17, in Claim 32, delete "routing, network" and insert -- routing network --, therefor.

Signed and Sealed this
Thirteenth Day of May, 2014

Michelle K. Lee
*Deputy Director of the United States Patent and Trademark Office*